United States Patent [19]
Mason

[11] Patent Number: 5,825,492
[45] Date of Patent: Oct. 20, 1998

[54] METHOD AND APPARATUS FOR MEASURING RETARDATION AND BIREFRINGENCE

[75] Inventor: Philip L. Mason, Ottawa, Canada

[73] Assignee: Jaton Systems Incorporated, Kanata, Canada

[21] Appl. No.: 638,218

[22] Filed: Apr. 26, 1996

[51] Int. Cl.[6] .................................................. G01B 9/02
[52] U.S. Cl. ......................... 356/345; 356/349; 356/351
[58] Field of Search .................................. 356/345, 351, 356/349

[56] References Cited

U.S. PATENT DOCUMENTS

| | | | |
|---|---|---|---|
| 4,171,908 | 10/1979 | Robert et al. | 356/33 |
| 4,709,145 | 11/1987 | Spillman | 250/227 |
| 4,740,078 | 4/1988 | Daendliker et al. | 356/35.5 |
| 4,789,236 | 12/1988 | Hodor et al. | 356/33 |
| 4,867,565 | 9/1989 | Lequime | 356/351 |
| 4,883,952 | 11/1989 | Jones | 250/225 |
| 4,928,005 | 5/1990 | Lefevre et al. | 250/227.23 |
| 4,973,163 | 11/1990 | Sakai et al. | 356/367 |
| 5,064,270 | 11/1991 | Turpin et al. | 350/96.29 |
| 5,177,555 | 1/1993 | Stratton et al. | 356/35.5 |
| 5,255,068 | 10/1993 | Emo et al. | 356/351 |
| 5,317,524 | 5/1994 | Das et al. | 364/557 |
| 5,400,131 | 3/1995 | Stockley et al. | 356/33 |
| 5,406,371 | 4/1995 | Sakai et al. | 356/367 |

FOREIGN PATENT DOCUMENTS

| | | | |
|---|---|---|---|
| 2024831 | 9/1990 | Canada | 354/28 |
| 2024832 | 9/1990 | Canada | 354/28 |

*Primary Examiner*—Frank G. Font
*Assistant Examiner*—Robert Kim
*Attorney, Agent, or Firm*—Neil Teitelbaum & Associates

[57] ABSTRACT

This invention discloses an optical and computation system that enables the magnitude of the retardation, or the birefringence, in a birefringent material to be measured. This is achieved by consideration of the spectral interference pattern generated by combining quadrature axes of polarized light that have passed through the material, however, unlike other approaches, this invention removes the spectral intensity variations of the light source and the spectral attenuation variations of the optical system before analyzing the resultant spectral interference pattern. Since the spectral interference pattern is unique for each retardation or birefringence value, this invention provides an absolute measure of these quantities. Additionally this invention permits the full range of retardations or equivalent birefringence values to be measured, from zero retardation to any (large) value that does not create interference modulations, the frequency of which exceed the Shannon-Kotelnikov criteria for the wavelength or spectral sampling implemented. Further, in the second main embodiment of this invention, the dependence on stored light source spectral intensities and stored optical light path attenuations is removed, with the system being independent of any time dependent variations in intensity and/or attenuations and additionally, being independent of any axial alignment or setup requirements.

64 Claims, 15 Drawing Sheets

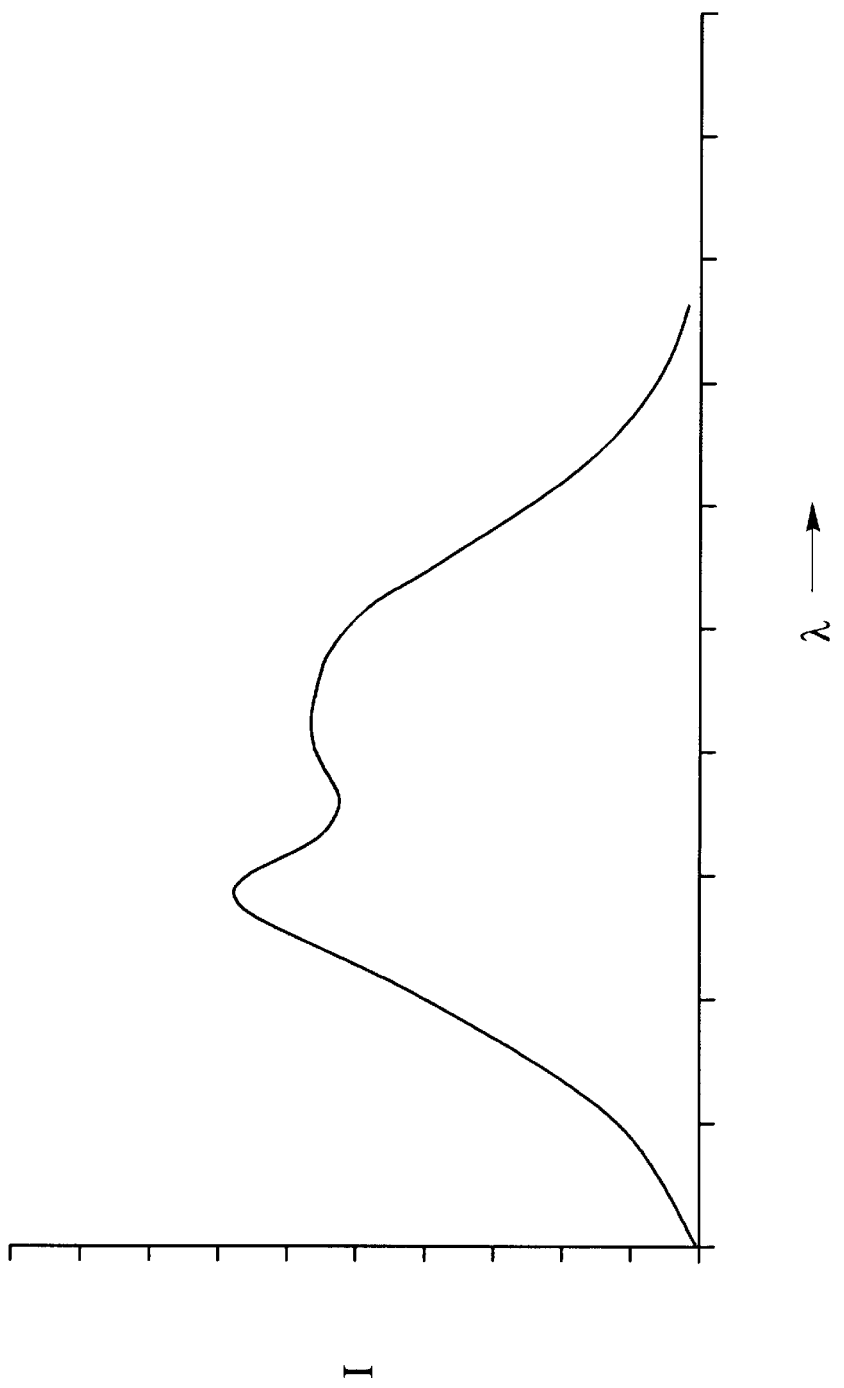

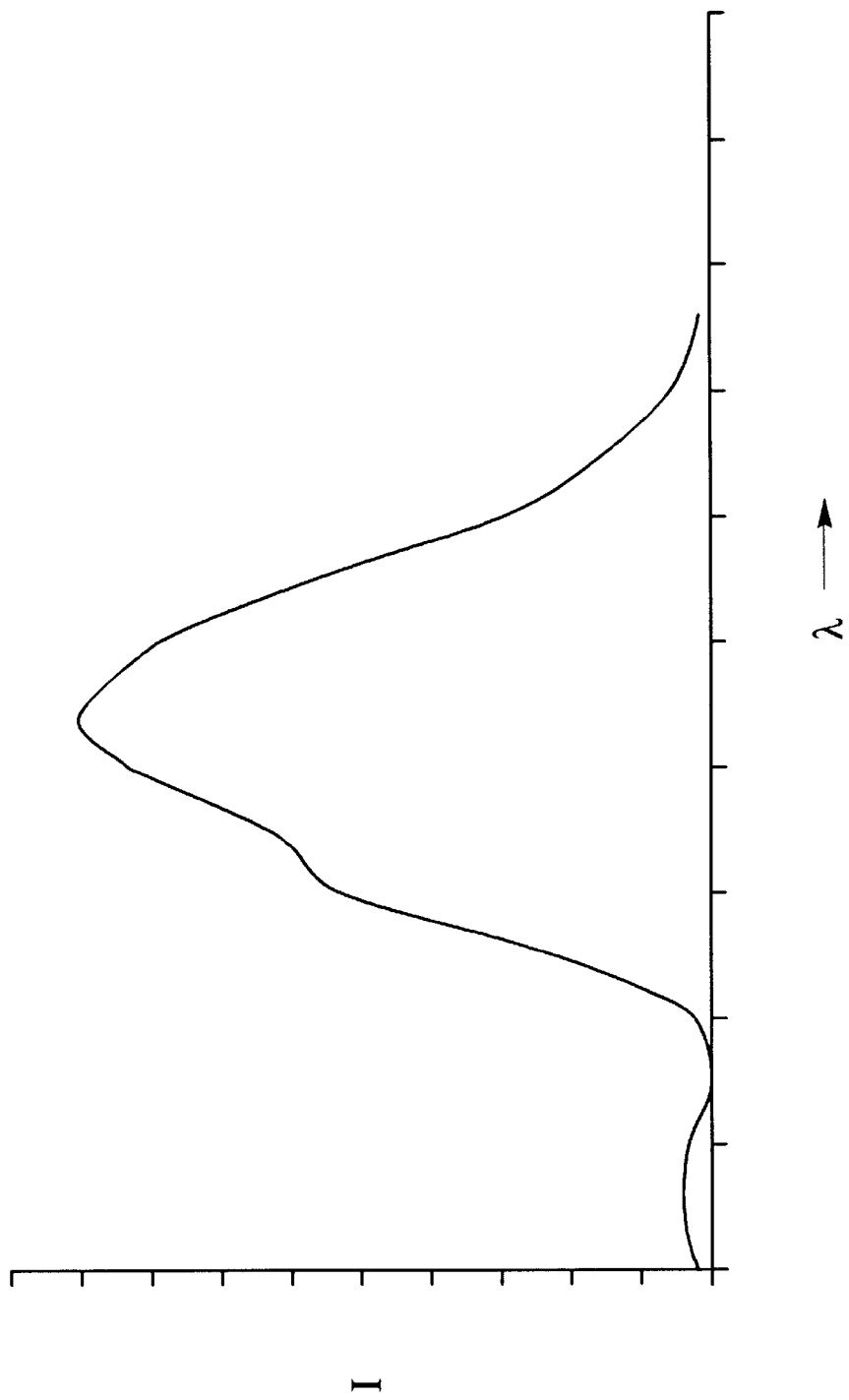

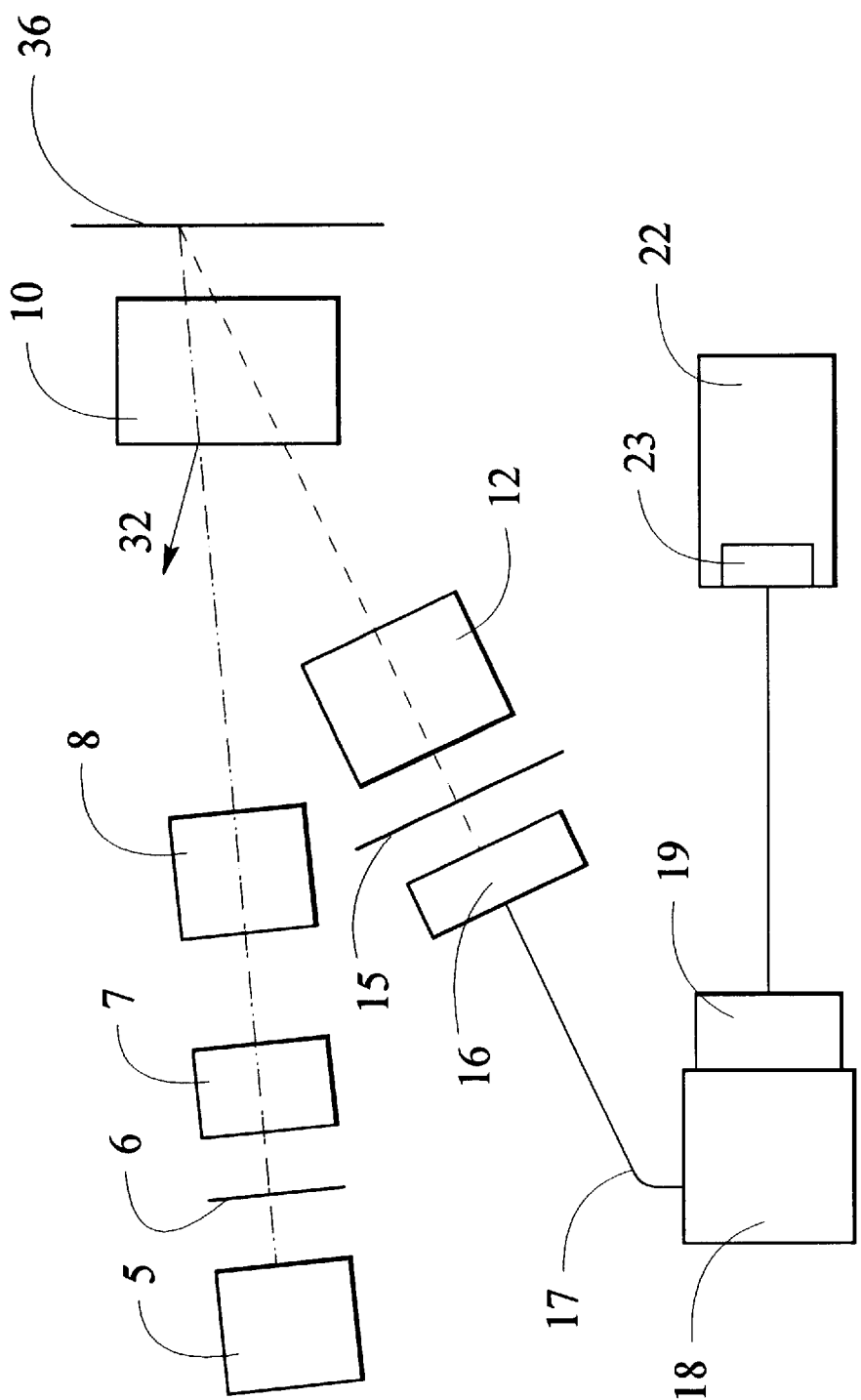

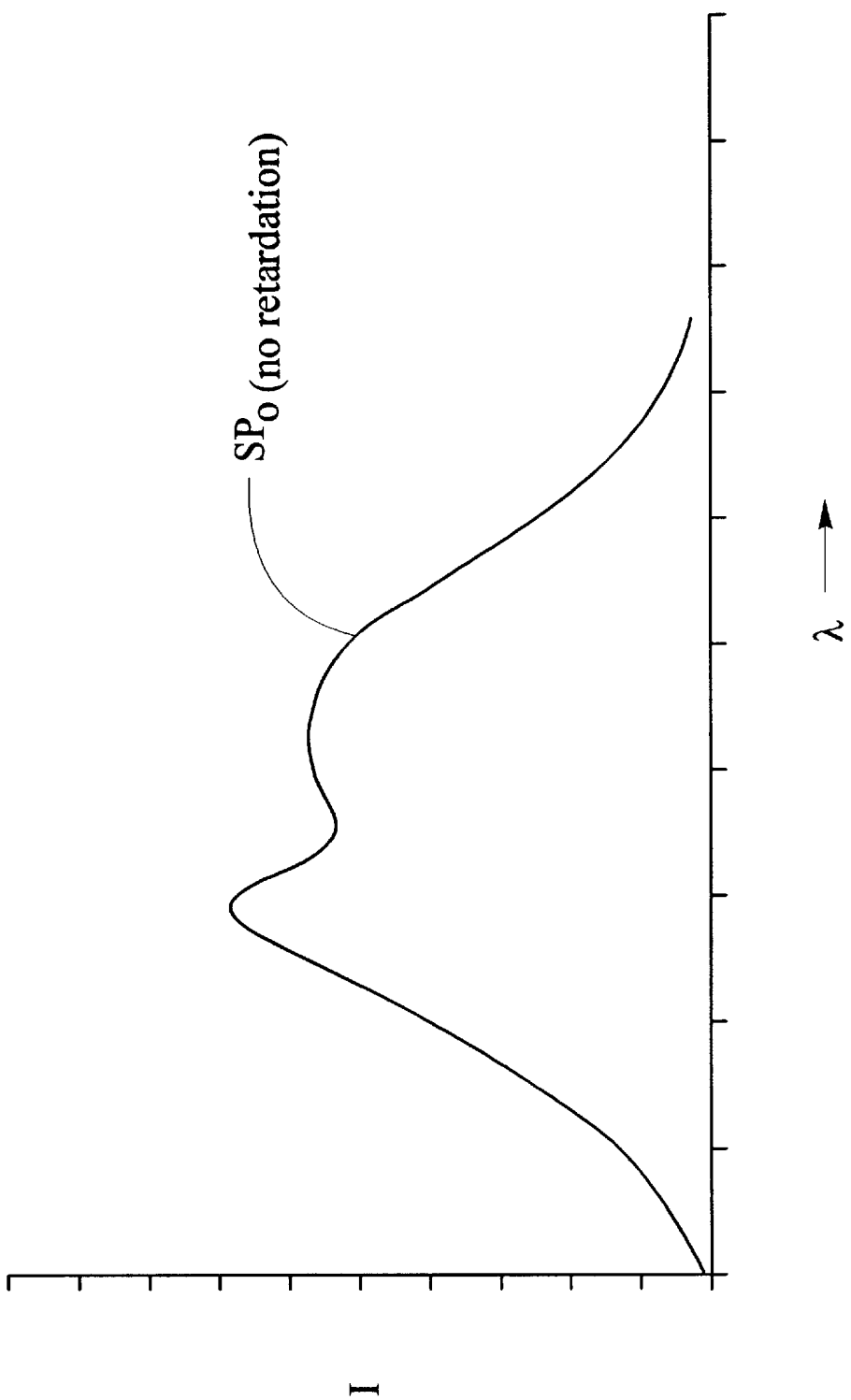

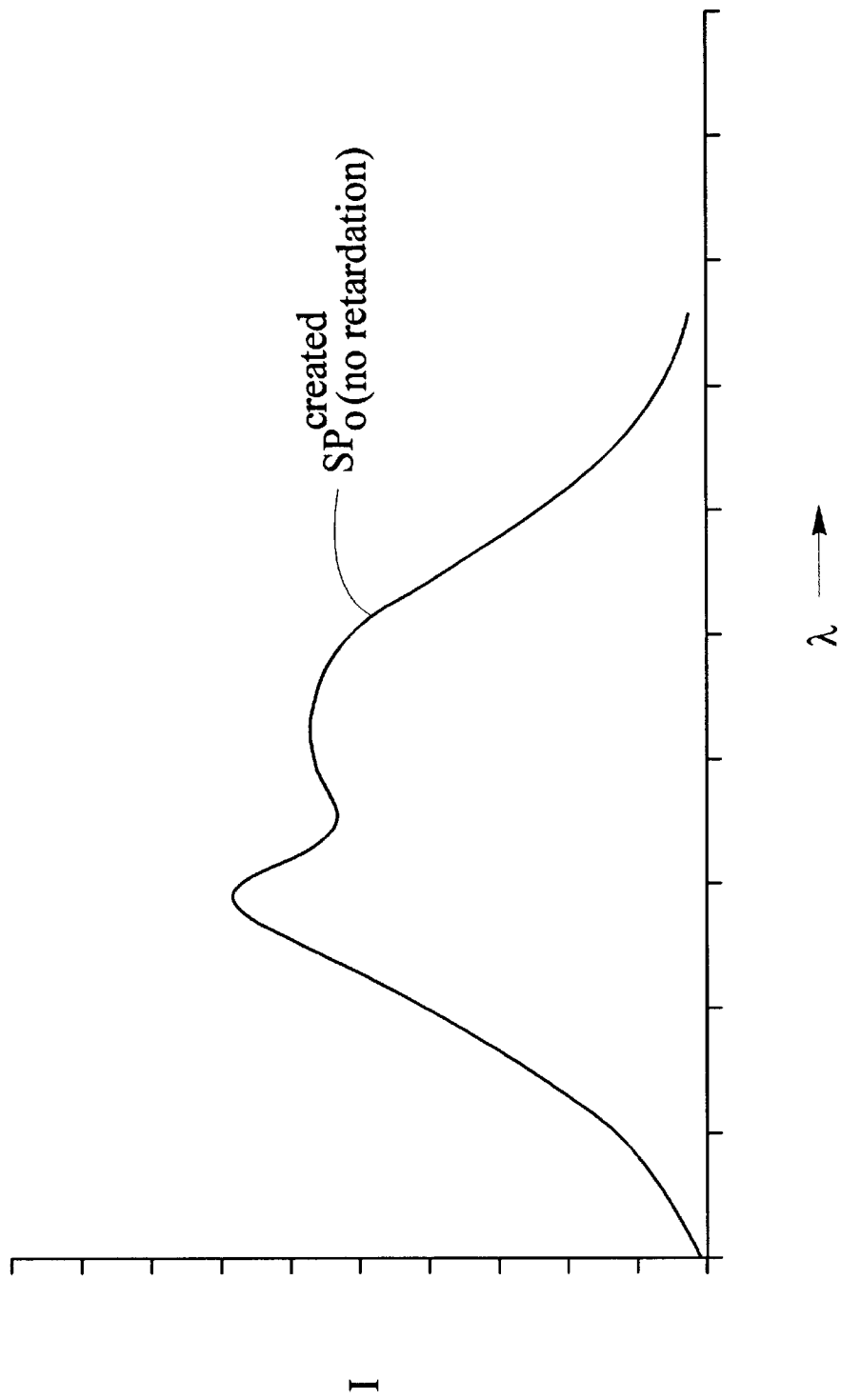

METHOD AND APPARATUS FOR MEASURING RETARDATION AND BIREFRINGENCE

FIELD OF THE INVENTION

This invention relates generally to the field of optical measuring methods and devices, and more specifically to a method and apparatus for measuring the retardation induced by a birefringent material and the birefringence of that material.

BACKGROUND OF THE INVENTION

This invention discloses an optical and computation system that enables the magnitude of the retardation, or the birefringence, in a birefringent material to be measured. This is achieved by consideration of the spectral interference pattern generated by combining quadrature axes of polarized light that have passed through the material, however, unlike other approaches, this invention removes the spectral intensity variations of the light source and the spectral attenuation variations of the optical system before analyzing the resultant spectral interference pattern. Since the spectral interference pattern is unique for each retardation or birefringence value, this invention provides an absolute measure of these quantities. Additionally this invention permits the full range of retardations or equivalent birefringence values to be measured, from zero retardation to any (large) value that does not create interference modulations, the frequency of which exceed the Shannon-Kotelnikov criteria for the wavelength or spectral sampling implemented. Further, in the second main embodiment of this invention, the dependence on stored light source spectral intensities and stored optical light path attenuations is removed, with the system being independent of any time dependent variations in intensity and/or attenuations and additionally, being independent of any axial alignment or setup requirements.

The classical approaches to the measurement of retardation and birefringence utilize a polariscope with either monochromatic light and a fringe counting method or polychromatic light and colour matching or cancellation using a Babinet-Soleil compensator or equivalent. In both cases human interaction and decisions are required, plus in the former case the measurements are relative wherein an up/down count must be maintained, and in the latter case repetitions of similar colours for lower retardation values and the loss of distinct colours for higher retardation values increase the difficulty of obtaining precise measurements. Several approaches to overcoming these limitations and automating the measurement procedure have been developed. Stockley and Buckberry as in U.S. Pat. No. 5,400,131, issued Mar. 21, 1995 disclose the use of fringe maps of a region using monochromatic procedures with linear polarized light as the input. The output is analyzed twice, initially through a linear polarizer set parallel to the axis of the input light and subsequently through the same polarizer rotated through 90 degrees. The relative intensities of the fringes are considered to create a retardation map caste, in accordance with their teachings in the form of a mechanical stress map. Thus moving parts or dual optical paths are required to realize the process which also needs a traceable reference from which fringe maps can be calibrated. Emo et al, in U.S. Pat. No. 5,255,068, issued Oct. 19, 1993, disclose polarizing broad spectrum light, passing it through a birefringent element, spectrally separating and analyzing in terms of spectral modulation or fringes. No demodulation is applied to remove the spectral variations attributable to the light source, optical system or detectors, and since a fringe counting approach is used, although in the spectral domain, a reasonable number of fringes are required to provide acceptable accuracy; these are measured using an interferometer employing moving parts under direct operator control. Similarly that of Lequime, as disclosed in U.S. Pat. No. 4,867,565, issued Sep. 19, 1989, introduces the concept of modulation of the light source by the birefringent material in combination with a polarizer and analyzer, but the modulated spectra is subsequently not analyzed nor demodulated in terms of the frequency or wavelength of the light, but rather is further modulated by additional birefringent elements to generate a correlation function, the output of which is converted to electronic signals for additional analysis and processing. The introduction of the additional birefringent elements adds to the complexity of the system, subjects the processing ease and accuracy to limitations based on the bandwidth and centre frequency of the light source and further, in one preferred variant requires moving parts to introduce different amounts of birefringence into the correlation optical subsystem.

SUMMARY OF THE INVENTION

The present invention aims to provide methods for determining retardation and birefringence automatically without operator decisions or intervention while avoiding the drawbacks and limitations outlined above with the prior art.

Accordingly the invention provides methods and devices for measuring the retardation induced by a birefringent material and for measuring the birefringence of that material. This invention is applicable for use with all natures of non-opaque materials, in both transmitting and reflection configurations, does not use rotating or moving optical elements and further, does not require close contact with the material. The invention provides for the absolute measurement of a broad continuous range of retardations and birefringent values starting at zero, makes possible high repetition rates for the measurements and, once the device has been set up, for automated measurements without the need for operator decisions or intervention. Additionally this invention provides for very high accuracy of retardation measurement, particularly in the second broad embodiment where it is independent of light source variations and changes in optical path performance, and largely independent of ambient light conditions.

The invention relates to the measurement of retardation by consideration of the spectral modulation that can be induced by causing two beams of polychromatic light, one delayed or retarded with respect to the other, to combine, resulting in constructive and destructive interference and observable (using appropriate equipment) as a modulation of the light source spectral intensity pattern. However, unlike other inventions in this field, this invention demodulates this modulated spectral intensity pattern to provide a spectral interference pattern or signature, independent of source and light path, which lends itself to easy and accurate determination of the retardation value between the two previously combined light beams. This value being the retardation introduced by the birefringent material and from which, with knowledge of the length of the light path through the material, the birefringence of the material is calculated. In a first embodiment of this invention, the light source spectral intensity pattern, the optical system spectral attenuations and the detector system efficiencies are stored for use in the demodulation process as the lumped spectral response of the system when there is no induced retardation. In a second embodiment this lumped spectral response is calculated each time a measurement is made by combining the spectral responses obtained from the different combining means. Thus historical data is not used and accuracy and trackability is improved.

The methods comprise the steps of:

- forming broad spectrum polarised light and passing it through the birefringent material, the polarisation being of known form, either circular, elliptical or linear.
- recognising that the polarised light can be considered as passing through the birefringent material along its orthogonal optical axes of which one permits light to travel along it faster than along the other, thus the emerging light from one axis is time and spatially retarded with respect to light having passed along the other axis.
- causing the light from the two axes to interfere using a combining device of known form, such as a circular, elliptical or linear polariser.
- analyzing the spectrum of the combined light to obtain a spectral intensity plot, being the spectral intensity of the light source, modified by the attenuations and efficiencies of the optical path, which in turn is modulated by the interference pattern resulting from combining the light from the two axes.
- demodulating this spectral plot by dividing it, or normalising, it with a comparable spectral plot obtained when there is no relative retardation occurring in the light path, such as when the birefringent material is not exhibiting any birefringence or when the material is removed from the light path.
- considering this demodulated spectral interference pattern or signature in terms of the frequency content of the interference pattern or in terms of the theoretical interference patterns that are generated by different retardations and recognising that the pattern may be in phase, or inverted, depending on the directions of polarization of the input light, the combining device and the orientations of the optical axes within the birefringent material.
- for the case where birefringence is being measured, the value of retardation which satisfies the interference pattern as obtained above, together with the thickness of the material are used to calculate the birefringence value for the material.

In the method as outlined above, care has to be taken when using linear polarizers to ensure that they are not aligned with either of the optical axes of the birefringent material, since if this occurs light only passes along one axis, or is retrieved from only one axis, and thus there is no light from the second axis to cause interference. To overcome this limitation, a further refinement of this invention is the use of several combining devices, each set with its polarization axis at different directions and preferably with equal angular spacing between them. These combining devices are arranged so as to each receive some of the light that has passed along the two optical axes of the birefringent material. Spectral intensity plots are obtained for each combining devices and can be demodulated as above, or preferably demodulated using a reconstructed spectral plot which is equivalent to the spectral plot for the system in the absence of any retardation, and is formed by summing and scaling the intensity plots from each device. The final form of the summing and scaling being dependent on the relative directions of the axes of the combining devices. Thereafter the spectral interference patterns can be used individually, or the largest used, or they can be summed to reduce noise and used as the input to the above retardation extraction process. However in practice it has been found necessary to add compensating functions to address spectral attenuation variations between the light paths passing through the combining devices, and also to address the spectral efficiency of the combining device or devices.

With this improvement of the above outlined method, the limitation on the alignment of the birefringent material optical axes to the axes of the combining devices is removed and, for the preferred case when circular polarized light is used as the input, no alignment considerations are necessary.

In all cases the above methods can include, and the apparatus incorporate, a reflection mode whereby light is first passed through the birefringent material and then returned using any reflective system that does not invert the relative phases and polarizations such as to cause a cancellation of the relative retardation when the light repasses back through the material. A preferable configuration of the apparatus uses a diffuse reflector or partial retroreflector and permits the light path from the source to the birefringent material to be established such that the front surface reflections that have not been subject to relative retardation do not enter the combining devices. Alternatively where any reflector is used, and preferably a spectral reflector or full retroreflector, a light beam separation device can be used to direct reflected light to the combining device or devices. This reduces the amplitude of the interference modulation and of the demodulated interference pattern, and for which spectral compensation functions are developed being dependent on the polarization types and axial directions and on the absorption/reflection occurring on the face of the birefringent material.

BRIEF DESCRIPTION OF THE DRAWINGS

The preferred embodiments of the present invention will now be described, by way of example only, with reference to the accompanying drawings in which:

FIGS. 2a, 2b, 2c, and 2d are a set of graphs, FIG. 2a illustrating the spectral output of the light source, FIG. 2b the spectral output of the system when illuminated by this light source in the absence of any retardation from the birefringent material, FIG. 2c the spectral output when there is retardation occurring, and FIG. 2d a set of the normalized demodulated interference patterns;

FIGS. 3a and 3b are block diagrams representation of the apparatus with reflection introduced into the light path, FIG. 3a illustrates the apparatus when a beam splitting device is used to separate the input and output light beams, and FIG. 3b illustrates the apparatus when angular positioning is used to control what light is received by the combining device;

FIG. 5a illustrates the apparatus when a beam splitting device is used to separate the input and output light beams, and FIG. 5b illustrates the apparatus when angular positioning is used to control what light is received by the combining device; and, FIGS. 6a to 6e are a set of graphs, FIG. 6a illustrating the spectral output of the light source.

DETAILED DESCRIPTION OF THE INVENTION

Figure 1:
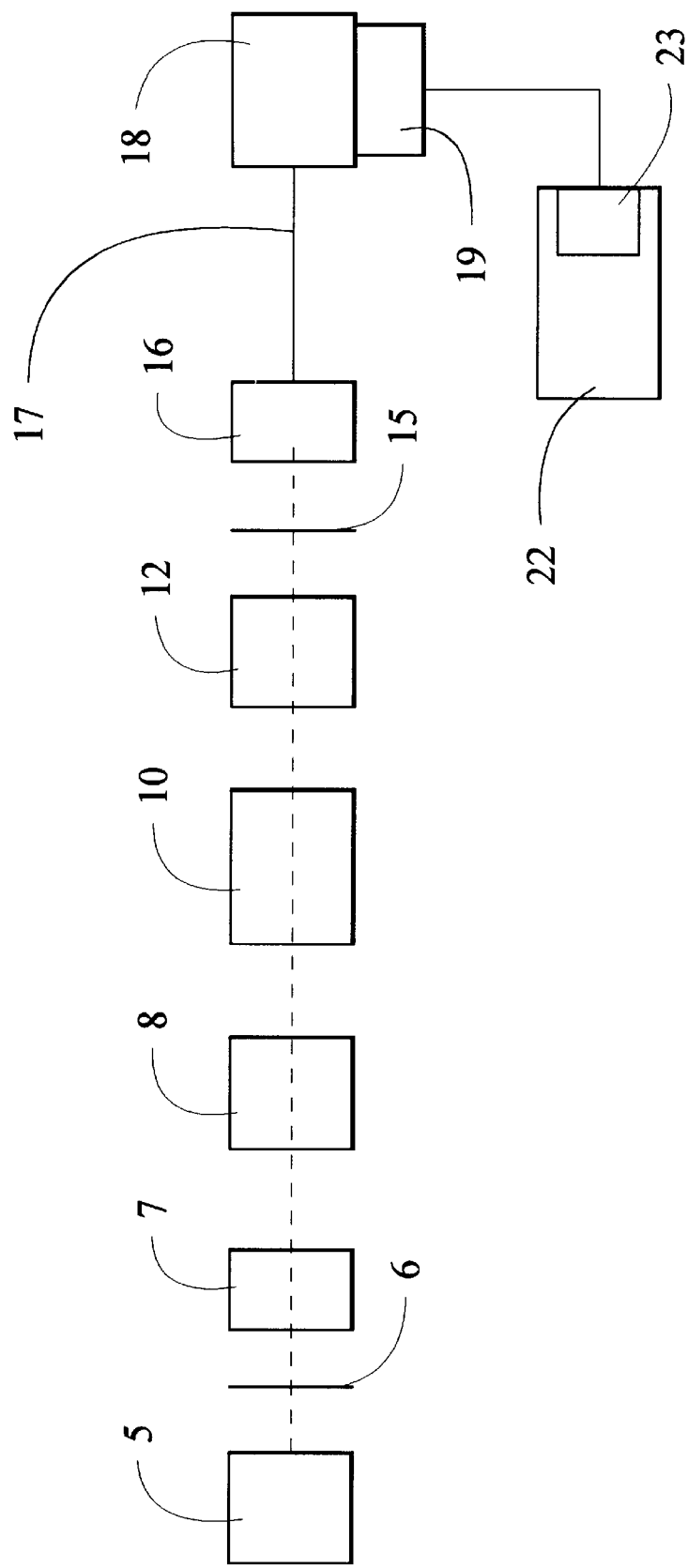
FIG. 1 is a block diagram representation of the apparatus according to the first preferred embodiment of the present invention.

Referring now to FIG. 1, a source of circular polarised light comprising a broad spectrum light source 5, a linear polarizer 6 and a Fresnel rhomb 7, is directed onto an object of birefringent material 10 using a combination of focusing and directing optical elements 8. Light (shown by a dotted line) that has passed through the birefringent material is collected and directed by further optical elements 12 to a linear polarizer 15, the axis of which is set at any angle other than in alignment with the optical axes of the birefringent material and where possible at $\pi/4$ to an optical axis; this polarizer combines the quadrature components of the light that has passed through the birefringent material. The combined light is coupled into an optical fibre 17, using a coupling lens system 16, and conveyed to a holographic grating spectrometer 18, the output of which is directed onto the detectors of a solid state CCD camera 19. The intensity values of each pixel of the detector of the camera are measured, digitized and stored in the memory of a personal digital computer 22, under the control of software running in that computer, and using a digitizing interface card 23 installed in the computer. The camera is installed in the spectrometer so that the axis of the detector containing the greatest number of pixels is in the same direction as the direction of wavelength separation established by the holographic grating. A spectral intensity array SP(i), i=1 . . . n, is created by the software in the computer by summing the digitized intensity values for all those pixels in columns m+(i−1).w to m+i.w−1, for i=1 . . . n. Where column m is the first column receiving measurable intensities and being dependent on the spectral output of the light source and the spectral attenuation of the overall optical system including the spectral sensitivity of the camera detectors and column m+i.w−1 being the last column with measurable received intensity, each group of summed columns being w columns wide. The wavelength of the spectrally separated light falling on the middle of each column is $\lambda$, $\lambda+\delta\lambda$, $\lambda+2\delta\lambda$, . . . , $\lambda+(n-1)\delta\lambda$, where $\delta\lambda$ is the incremental wavelength between successive groups of columns. Accordingly, since each entry in the above, and subsequently to be derived, arrays represent a determinable wavelength, all subsequent arrays will be described in terms of the variable $\lambda$, eg $SP(\lambda)$. Additionally since the spectrally separated output from the holographic grating does not fall on all rows of the camera detector, the above pixel intensity summations are performed only for those rows receiving spectral energy.

Spectral intensity arrays are obtained:
initially and as part of the equipment set up for the case where no light enters the combining polarizer, as $SP_{dark\ current}(\lambda)$,
again as part of the setup for the system when no retardation is being introduced by the birefringent material, or in its absence, as $SP_{no\ retardation}(\lambda)$,
and for measurement purposes, when the birefringent material is inserting retardation, as $SP_{retardation}(\lambda)$.

The $SP_{dark\ current}(\lambda)$ is bias in the measured intensity readings occurring due to biases, offsets and defects in the camera, detectors and interface card. By measuring it as part of the set up this bias can be removed from subsequent intensity measurements as:

$$SP^*_{no\ retardation}(\lambda)=SP_{no\ retardation}(\lambda)-SP_{dark\ current}(\lambda)$$

$$SP^*_{retardation}(\lambda)=SP_{retardation}(\lambda)-SP_{dark\ current}(\lambda)$$

The spectral intensity measured as above by the camera comprises the product of the spectral attenuations of each of the q optical elements between the light source and the camera, $SA_i(\lambda)$ i=1 . . . q, including any spectral attenuation of the bulk birefringent material not associated with its birefringent properties; the average spectral efficiencies of the individual pixel detectors in each summing region, $SE_{pixel}(\lambda)$; the spectral efficiency of the combining linear polarizer, $SE_{linpol}(\lambda)$; the spectral efficiency of the spectrometer, $SE_{spec}(\lambda)$; and the spectral attenuations of the circular polarizer elements, $SA_{cirpol}(\lambda)$; acting on the spectral output of the light source $I_{source}(\lambda)$, which in turn is modulated by the interference pattern resulting from combining the quadrature components of the light. If this interference pattern is, $INTER_{no\ retard}(\lambda)$, for the case when no retardation is occurring, and $INTER_{retard}(\lambda)$ when retardation is occurring then:

$$SP^*_{no\ retardation}(\lambda)=\{\Pi_1^q SA_i(\lambda)\}.SE_{pixel}(\lambda).SE_{linpol}(\lambda).SE_{spec}(\lambda).SA_{cirpol}(\lambda).INTER_{no\ retard}(\lambda).I_{source}(\lambda)$$

$$SP^*_{retardation}(\lambda)=\{\Pi_1^q SA_i(\lambda)\}.SE_{pixel}(\lambda).SE_{linpol}(\lambda).SE_{spec}(\lambda).SA_{cirpol}(\lambda).INTER_{retard}(\lambda).I_{source}(\lambda)$$

Thus the unknown spectral attenuation and efficiency effects of all the optical elements in the system including the light source can be avoided and removed by normalising the spectral measurements obtained under conditions of retardation by the spectral measurement taken when no retardation is occurring.

$$\frac{SP^*_{retardation}(\lambda)}{SP^*_{no\ retardation}(\lambda)} = \frac{INTER_{retard}(\lambda)}{INTER_{no\ retard}(\lambda)}$$

Figure 2A:
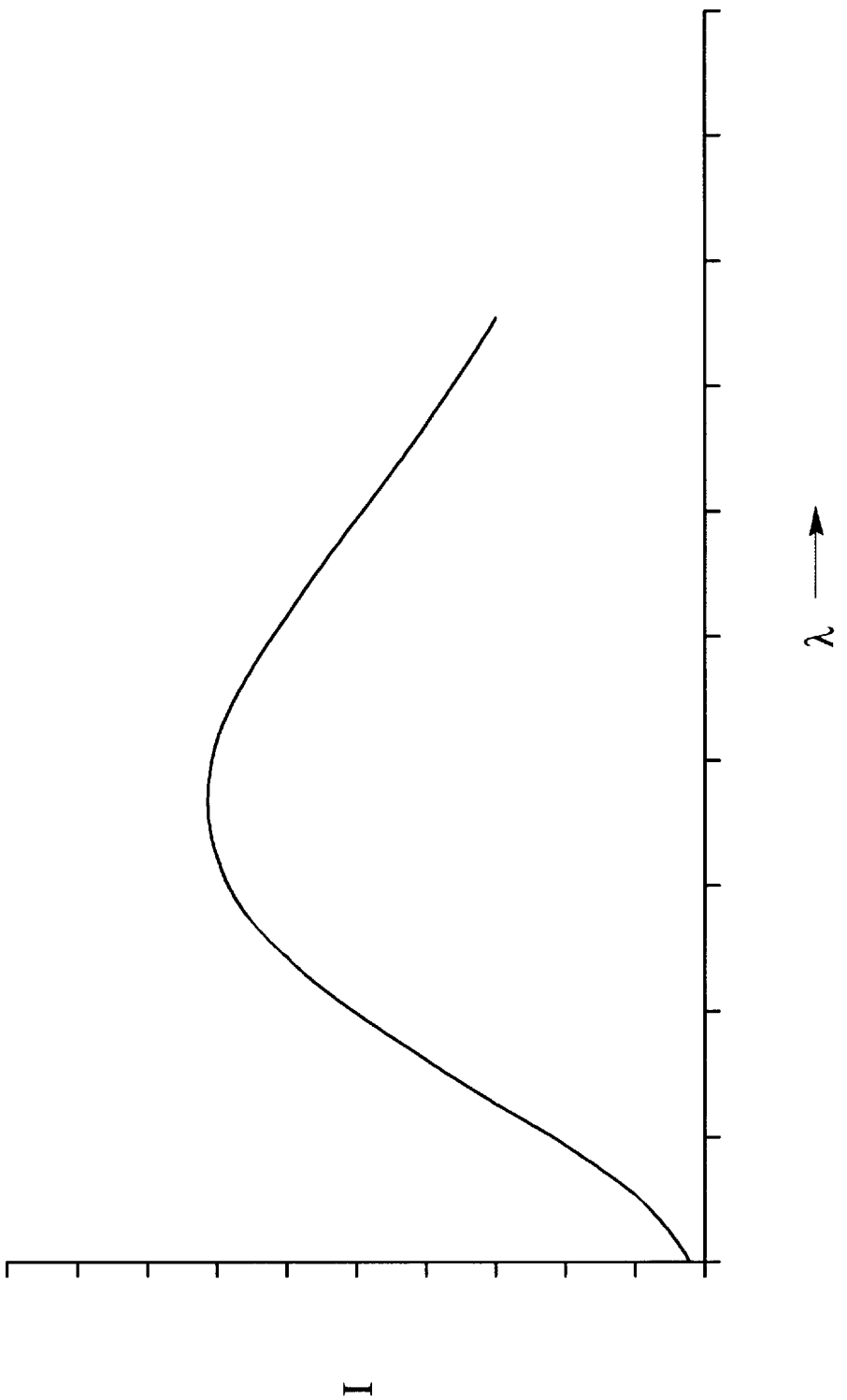
Figure 2D:
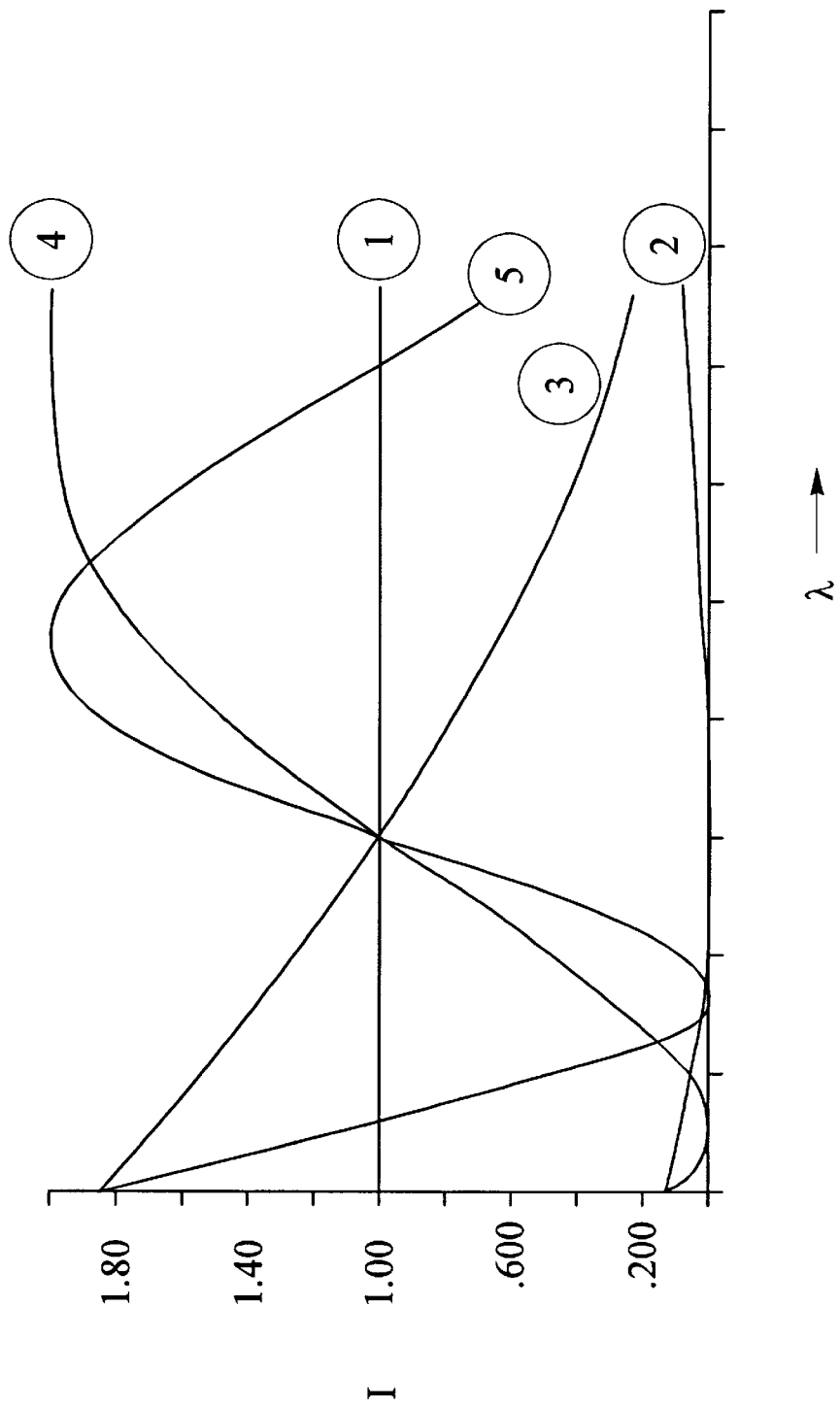

FIG. 2a provides an example of a graph of a typical source spectral intensity $I_{source}(\lambda)$; FIG. 2b provides an example of a corresponding spectral output of the system, $SP^*_{no\ retardation}(\lambda)$ when no retardation is occurring; FIG. 2c is a graph of a typical spectral intensity, $SP^*_{retardation}(\lambda)$ when retardation is occurring; and FIG. 2d illustrates a series of normalized graphs of $INTER_{retard}(\lambda)/INTER_{no\ retard}(\lambda)$ for increasing values of retardation.

Figure 3A:
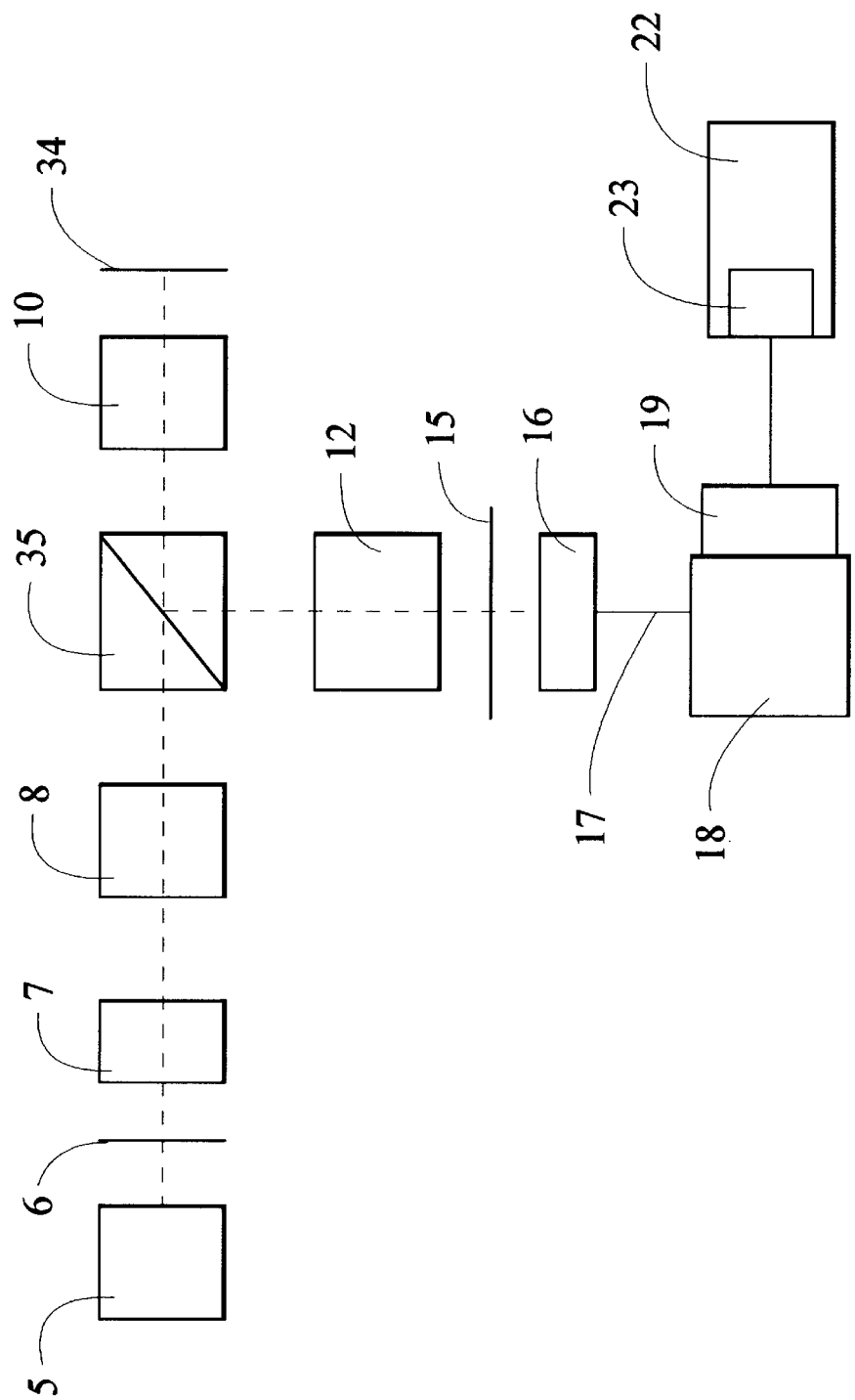

An alternative arrangement for the system described above and detailed in FIG. 1, introduces a reflector into the light path, either as a spectral reflector or full retroreflector 34 as shown in FIG. 3a wherein a beam separation 35 device is used to direct the reflected light to the combining linear polarizer; or using a partial retroreflector or a diffuse reflector 36 as shown in FIG. 3b where the path of the incident light and the light path from the birefringent material to the combining linear polarizer is established to avoid the spectral reflections 32 from the front surface of the birefringent material passing into the combining linear polarizer 15. For both forms of reflection as described above, the effect is to increase the path length of the light through the birefringent material thus increasing the retardation between the quadrature axes of the light.

Now to consider, with the aid of the Jones calculus, the processes that generate the interference patterns $INTER_{retard}(\lambda)$ and $INTER_{no\ retard}(\lambda)$, however instead of defining the reference direction as the direction of the linear polarizer used in the circular polarizing function, the direction of the principal axis of the birefringent material will be used as the reference direction, and further recognize that the circular polarized light will pass equally along both of the axes of the birefringent material. If $E_{cp}$ is the vector describing the electric field of the input circular polarized light directed at the birefringent material, $|M_{bm}|$ is the matrix describing the birefringent material process introducing retardation between light passing along its orthogonal optical axes, $|M_{lp}|$ the matrix describing the linear polarizing process of the combining device, then $E_o$, the vector describing the electric field of the output from the combining linear polarizer is formed as:

$$E_o 32 |M_{lp}||M_{bm}|E_{cp}$$

substituting and expanding for the case where φ retardation is introduced by the birefringent material, the axis of the combining linear polarizer is at angle α to the principal axis of the birefringent material and there is unity input intensity, then $$E_o = \frac{1}{\sqrt{2}} \begin{bmatrix} \cos\alpha & \sin\alpha \\ 0 & 0 \end{bmatrix} \begin{bmatrix} 1 & 0 \\ 0 & e^{i\phi} \end{bmatrix} \begin{bmatrix} 1 \\ i \end{bmatrix}$$

$$= \frac{1}{\sqrt{2}} \begin{bmatrix} \cos\alpha + ie^{i\phi}\sin\alpha \\ 0 \end{bmatrix}$$

Now the intensity, $I_o$, is equal to the sum of the squares of the amplitudes of the electric components of the light wave, or in matrix form, the product of premultiplying $E_o$ with its Hemetian adjoint, which is defined as the complex conjugate of the transpose of the matrix, thus:

$$I_o = E_o^{T*} \cdot E_o$$

$$= \frac{1}{\sqrt{2}} [\cos\alpha - ie^{-i\phi}\sin\alpha\ 0] \frac{1}{\sqrt{2}} \begin{bmatrix} \cos\alpha + ie^{i\phi}\sin\alpha \\ 0 \end{bmatrix}$$

$$= \frac{1}{2}\{1 + i\sin\alpha\cos\alpha\,(e^{i\phi} - e^{-i\phi})\}$$

$$= \frac{1}{2}\{1 - \sin(2\alpha)\sin\phi\}$$

For the condition of no retardation, φ=0, thus sin φ=0, and $I_o$ reduces to $I_o=½$, thus whatever angle the axis of the combining polarizer is set at, only half the input intensity will emerge. Therefore it follows that:

$$\frac{I_{o\,(retardation)}}{I_{o\,(no\,retardation)}} = \frac{1/2\,\{1 - \sin(2\alpha)\sin\phi\}}{1/2}$$

$$= 1 - \sin(2\alpha)\sin\phi$$

Thus there is a modulation function, sin φ, with amplitude controlled by sin(2α), which is non-varying for a given alignment between the axes of the birefringent material and the axis of the combining polarizer, and in the preferred case, α=π/4, so sin(2α)=1.

Now consider sin φ, where φ is the phase retardation between light passing along the orthogonal axes of the birefringent material. In terms of wavelength of the light passing through the system sin φ may be restated as sin (2πR/λ), where R is the retardation measured in length units, typically nanometres, and λ, the wavelength, is measured in the same units.

Thus $$\frac{SP^*_{retardation}(\lambda)}{SP^*_{no\,retardation}(\lambda)} = \frac{INTER_{retard}(\lambda)}{INTER_{no\,retard}(\lambda)}$$

$$= \left\{1 - \sin(2\alpha)\sin\frac{(2\pi R)}{\lambda}\right\}\left\{\frac{SP_{input}(\lambda)}{SP_{input}(\lambda)}\right\}$$

$$= 1 - \sin(2\alpha)\sin\frac{(2\pi R)}{\lambda}$$

Typical curves of the normalised or demodulated spectral interference function $SP^*_{retardation}(\lambda) / SP^*_{no\,retardation}(\lambda)$ are shown in FIG. 2d. The value of retardation R can now be extracted from these demodulated interference patterns in a variety of ways including curve fitting using a fit function of the form $F(R)=1-A\sin(2\pi R/\lambda_i)$, where A is a variable that may take value between +1 and −1 to accommodate values of α between +π/4 and −π/4, and $\lambda_i$ is the midpoint wavelength for each array location. The birefringence value for the material can now be calculated using this value R of retardation and previously measured path length for the light passing through the birefringent material. Typically this is the thickness of the material or twice the thickness when a reflector is used.

Figure 4:
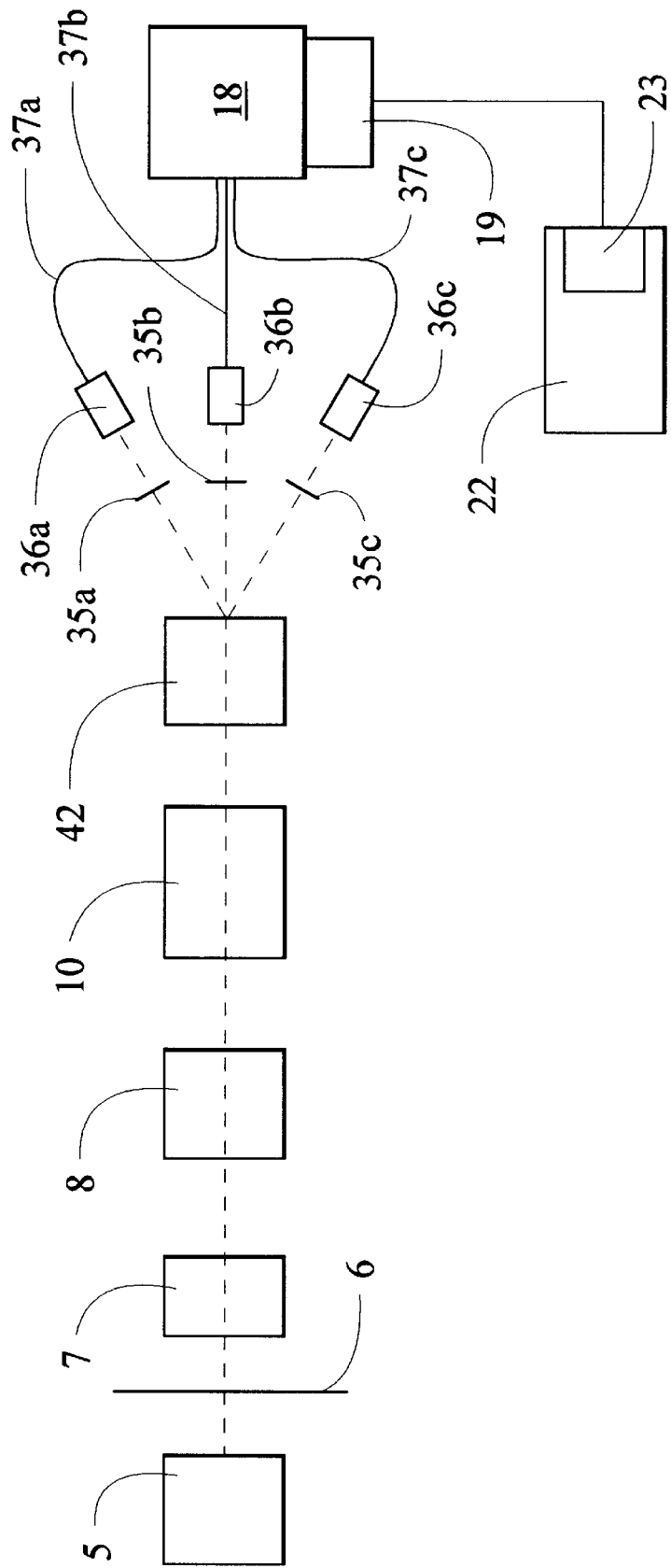
FIG. 4 is a block diagram representation of the apparatus according to the second preferred embodiment of the present invention where multiple combining devices are used.

The second preferred embodiment will now be described. Referring to FIG. 4, a source of circular polarised light comprising a broad spectrum light source 5, a linear polarizer 6 and a Fresnel rhomb 7, is directed onto an object of birefringent material 10 using a combination of focusing and directing optical elements 8. Light that has passed through the birefringent material is collected and directed by further optical elements 42 to a set of three linear polarizers 35a, 35b, and 35c, the axes of which are set at 2π/3 to each other and at any angle to the optical axes of the birefringent material, these polarizers each combine portions of the quadrature components of the light that has passed through the birefringent material. The output from each linear polarizer is coupled into separate optical fibres 37a, 37b and 37c, using coupling lens systems 36a, 36b and 36c, and conveyed to a holographic grating spectrometer 18, where separate spectral separations are formed in parallel for each of the three inputs, with the outputs directed onto the detectors of a solid state CCD camera 19. The intensity values of each pixel of the detector of the camera are measured, digitized and stored in the memory of a personal digital computer 22, under the control of software running in that computer, and using a digitizing interface card 23 installed in the computer. The camera is installed in the spectrometer so that the axis of the detector containing the greatest number of pixels is in the same direction as the direction of wavelength separation established by the holographic grating. Three spectral intensity arrays $SP_0(i)$, $SP_{120}(i)$, and $SP_{240}(i)$, i=1 . . . n, are created by the software in the computer by summing the digitized intensity values for all those pixels in columns m+(i−1).w to m+i.w−1, for i=1 . . . n, in rows k1 to k2 for array $SP_0$, rows k3 to k4 for array $SP_{120}$, and rows k5 to k6 for array $SP_{240}$. Where column m is the first column receiving measurable intensities and being dependent on the spectral output of the light source and the spectral attenuation of the overall optical system including the spectral sensitivity of the camera detectors and column m+i.w−1 being the last column with measurable received intensity, each group of summed columns being w columns wide; and where rows k1 to k2 receive the spectrally separated light originating from the linear polarizer combining device set at the arbitrary direction of 0, rows k3 to k4 receive the spectrally separated light originating from the linear polarizer combining device set at 2π/3 to the arbitrary direction of 0, and rows k5 to k6 receive the spectrally separated light originating from the linear polarizer combining device set at 4π/3 (or equivalently at −2π/3) to the arbitrary direction of 0. The wavelength of the spectrally separated light falling on the middle of each column being $\lambda$, $\lambda+\delta\lambda$, $\lambda+2\delta\lambda$, ..., $\lambda+(n-1)\delta\lambda$, where $\delta\lambda$ is the incremental wavelength between successive groups of columns. Accordingly, since each entry in the above, and subsequently to be derived, arrays represent a determinable wavelength, all subsequent arrays will be described in terms of the variable $\lambda$, eg $SP_0(\lambda)$.

Spectral intensity arrays are obtained:

initially and as part of the equipment set up for the case where no light enters the combining polarizers, as $SP_{0\text{-}dark\ current}(\lambda)$, $SP_{120\text{-}dark\ current}(\lambda)$ and $SP_{240\text{-}dark\ current}(\lambda)$, again as part of the setup for the system when no retardation is being introduced by the birefringent material, or in its absence, as $SP_{0\text{-}no\ retardation}(\lambda)$, $SP_{120\text{-}no\ retardation}(\lambda)$, and $SP_{240\text{-}no\ retardation}(\lambda)$, and for measurement purposes, when the birefringent material is inserting retardation, as $SP_{0\text{-}retardation}(\lambda)$, $SP_{120\text{-}retardation}(\lambda)$, and $SP_{240\text{-}retardation}(\lambda)$.

The $SP_{0\text{-}dark\ current}(\lambda)$, $SP_{120\text{-}dark\ current}(\lambda)$ and $SP_{240\text{-}dark\ current}(\lambda)$, are biases in the measured intensity readings occurring due to biases, offsets and defects in the camera, detectors and interface card. By measuring them as part of the set up, these biases can be removed from subsequent intensity measurements by subtraction as:

$$SP^*_{ii\text{-}no\ retardation}(\lambda) = SP_{ii\text{-}no\ retardation}(\lambda) - SP_{ii\text{-}dark\ current}(\lambda)$$

$$SP^*_{ii\text{-}retardation}(\lambda) = SP_{ii\text{-}retardation}(\lambda) - SP_{ii\text{-}dark\ current}(\lambda) \text{ where ii=0, 120 and 240.}$$

Figure 6A:
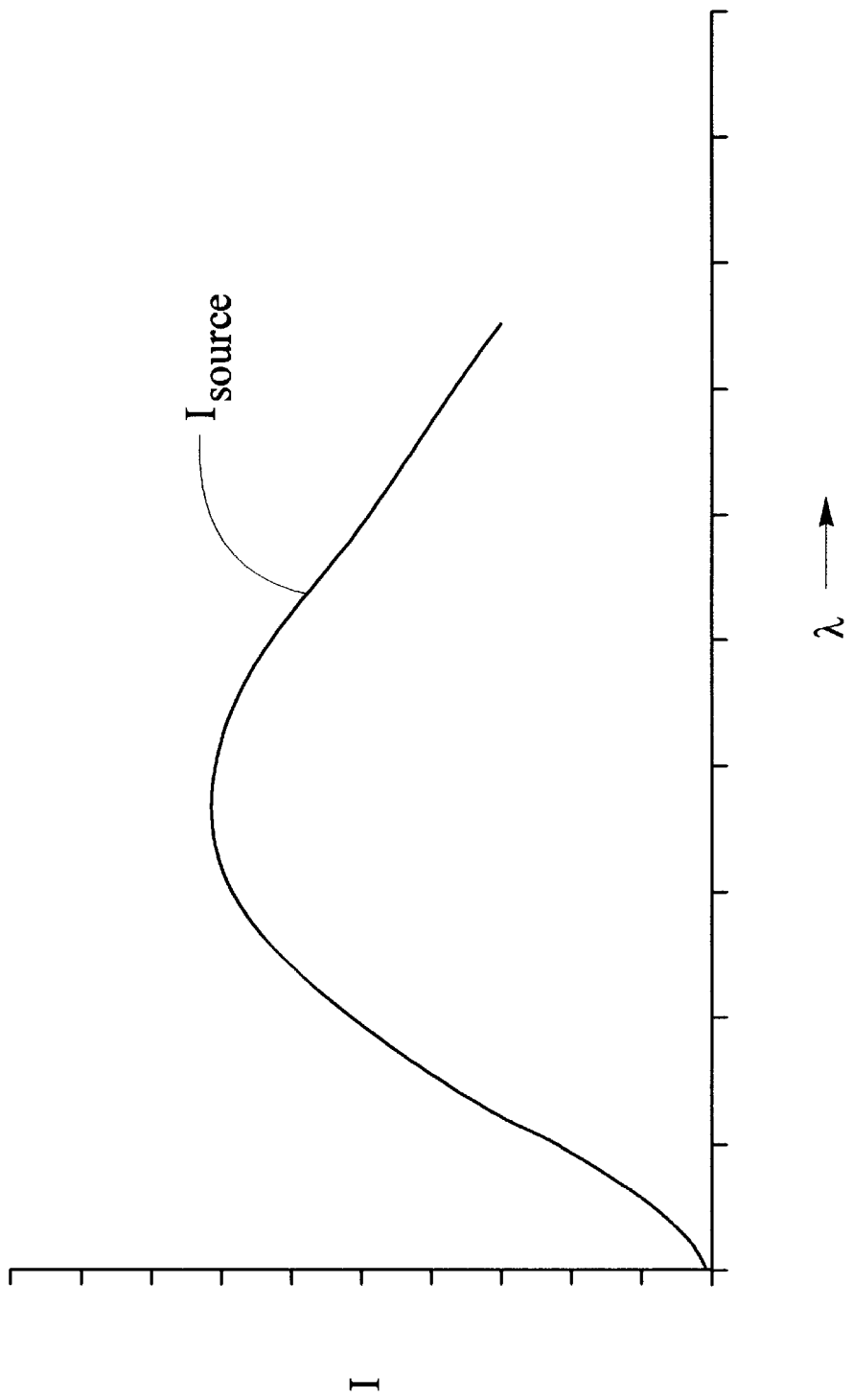
FIG. 6b illustrates the spectral input to the detectors in the absence of retardation.
FIGS. 6c illustrates the spectral outputs of each of the three combining devices when retardation is occurring.
FIG. 6d illustrates the reconstituted or created spectral throughput of the system in the absence of retardation, formed by appropriate summing and scaling of the spectral outputs of the combining devices when retardation is occurring.
FIG. 6e illustrates the demodulated interference patterns.
Figure 6C:
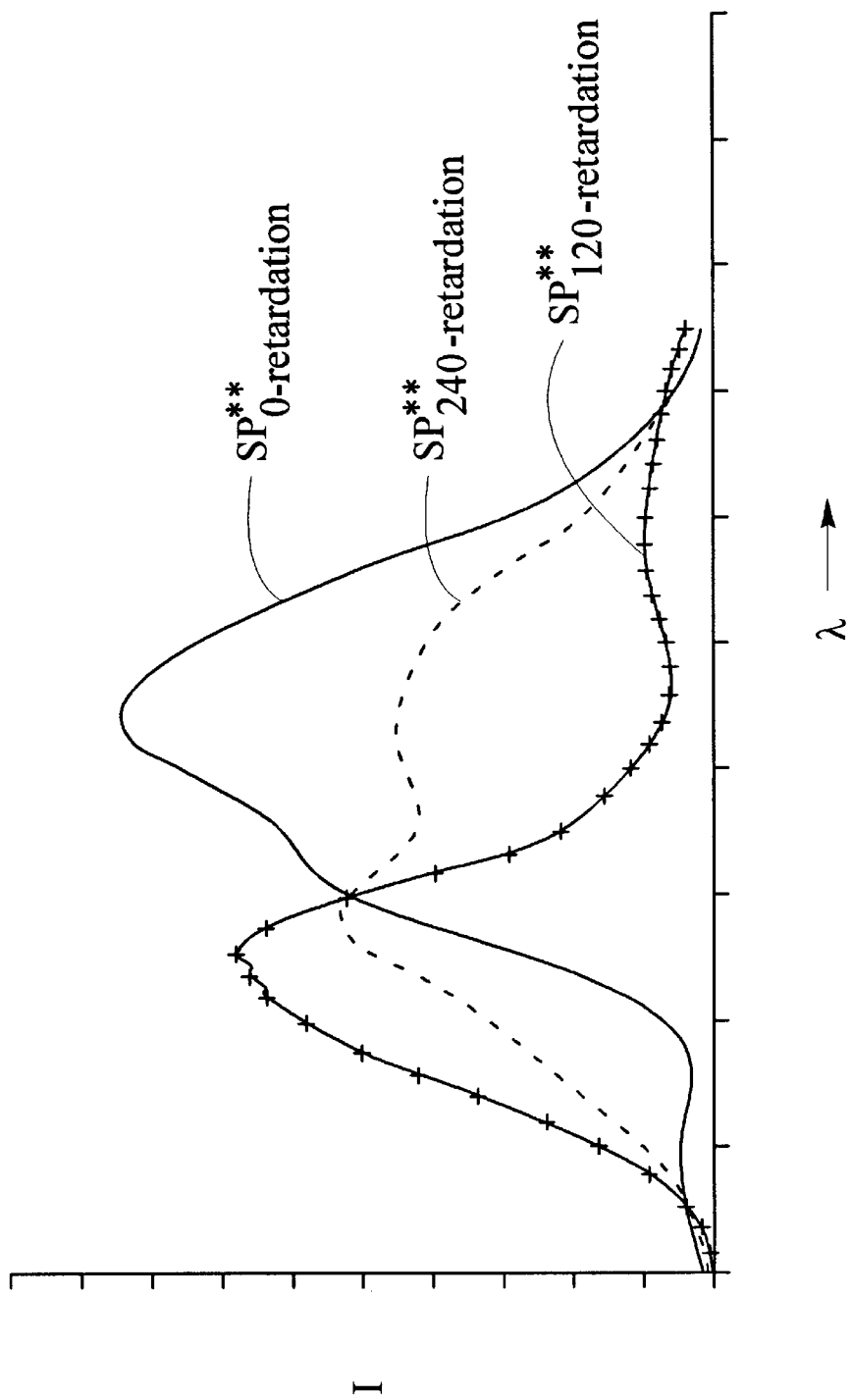

The spectral intensity measurements $SP^*_{0\text{-}no\ retardation}(\lambda)$, $SP^*_{120\text{-}no\ retardation}(\lambda)$, and $SP^*_{240\text{-}no\ retardation}(\lambda)$ are used to form equalization correction functions:

$$EQ_{ii}(\lambda) = \frac{(\text{largest of } SP^*_{0\text{-}no\ retardation}(\lambda) \text{ or } SP^*_{120\text{-}no\ retardation}(\lambda) \text{ or } SP^*_{240\text{-}no\ retardation}(\lambda), \text{ on a } \lambda \text{ by } \lambda \text{ basis})}{SP^*_{ii\text{-}no\ retardation}(\lambda)}$$

where ii = 0, 120 and 240.

which are applied to each spectral intensity measurement to compensate for variations in attenuation for light passing through the different combining devices and associated optical elements.

$$SP^{**}_{ii\text{-}retardation}(\lambda) = EQ_{ii}(\lambda) \cdot SP^*_{ii\text{-}retardation}(\lambda) \text{ where ii=0, 120 and 240.}$$

a typical set of these intensity patters is illustrated in FIG. 6c for the case where the light source is providing the spectral output illustrated in FIG. 6a, which in the absence of retardation provides the spectral throughput illustrated in FIG. 6b as input to the detector system.

Again, as above, the spectral intensity measured by the camera comprises the product of all the spectral attenuations and efficiencies for each device between the light source and the detectors, modulated by the interference pattern generated by each combining linear polarizer.

Now consider the previously developed expression:

$$\frac{I_{o\ (retardation)}}{I_{o\ (no\ retardation)}} = 1 - \sin(2\alpha)\sin\phi$$

and expand this applicable for each of the three combining devices, and also note that an axis oriented at 4π/3 is also oriented at π/3.

$$\frac{I_{o(0\text{-}retardation)}}{I_{o(no\ retardation)}} = 1 - \sin(2\alpha)\sin\phi$$

$$\frac{I_{o(240\text{-}retardation)}}{I_{o(no\ retardation)}} = 1 - \sin2(\alpha + \pi/3)\sin\phi$$

$$= 1 - \frac{\sin\phi}{2}\{\sqrt{3}\cos(2\alpha) - \sin(2\alpha)\}$$

$$\frac{I_{o(120\text{-}retardation)}}{I_{o(no\ retardation)}} = 1 - \sin2(\alpha + 2\pi/3)\sin\phi$$

$$= 1 - \sin2(\alpha - \pi/3)\sin\phi$$

$$= 1 + \frac{\sin\phi}{2}\{\sin(2\alpha) + \sqrt{3}\cos(2\alpha)\}$$

these individual intensities may be summed:

$$\frac{I_{o(0\text{-}retardation)} + I_{o(240\text{-}retardation)} + I_{o(120\text{-}retardation)}}{I_{o(no\ retardation)}} = 1 - \sin(2\alpha)\sin\phi +$$

$$1 - \frac{\sqrt{3}}{2}\sin\phi\cos(2\alpha) + \frac{1}{2}\sin(2\alpha)\sin\phi + 1 + \frac{\sqrt{3}}{2}\sin\phi\cos(2\alpha) +$$

$$\frac{1}{2}\sin(2\alpha)\sin\phi = 3$$

which provides that the output intensity at any angle under no retardation conditions can be determined by summing the output intensities measured through the three combining linear polarizers (each set at 2π/3 to each other) for the condition where retardation is occurring. Thus the normalising or demodulation function that was stored for subsequent usage in the first embodiment described above, can now be created or produced each time a retardation measurement is made, thereby accommodating any time variations in the spectral performance of the optical system and in particular changes in both intensity and spectral content of the light source.

$$I_{o(no\ retardation)} = \frac{I_{o(0\text{-}retardation)} + I_{o(240\text{-}retardation)} + I_{o(120\text{-}retardation)}}{3}$$

And comparably:

$$SP^{created}_{o(no\ retardation)} = SP_{o(no\ retardation)} =$$

$$\frac{SP_{o(0\text{-}retardation)} + SP_{o(240\text{-}retardation)} + SP_{o(120\text{-}retardation)}}{3}$$

A typical created spectral intensity array is illustrated in FIG. 6d. Hence each spectral intensity may be demodulated by normalising with respect to the created no retardation spectral intensity:

$$\frac{SP_{o(0\text{-}retardation)}(\lambda)}{SP^{created}_{o(no\ retardation)}(\lambda)} = 1 - \sin(2\alpha)\sin\frac{(2\pi R)}{\lambda}$$

$$\frac{SP_{o(240\text{-}retardation)}(\lambda)}{SP^{created}_{o(no\ retardation)}(\lambda)} = 1 - \sin2(\alpha + \pi/3)\sin\frac{(2\pi R)}{\lambda}$$

$$\frac{SP_{o(120\text{-}retardation)}(\lambda)}{SP^{created}_{o(no\ retardation)}(\lambda)} = 1 - \sin2(\alpha + 2\pi/3)\sin\frac{(2\pi R)}{\lambda}$$

Figure 6E:
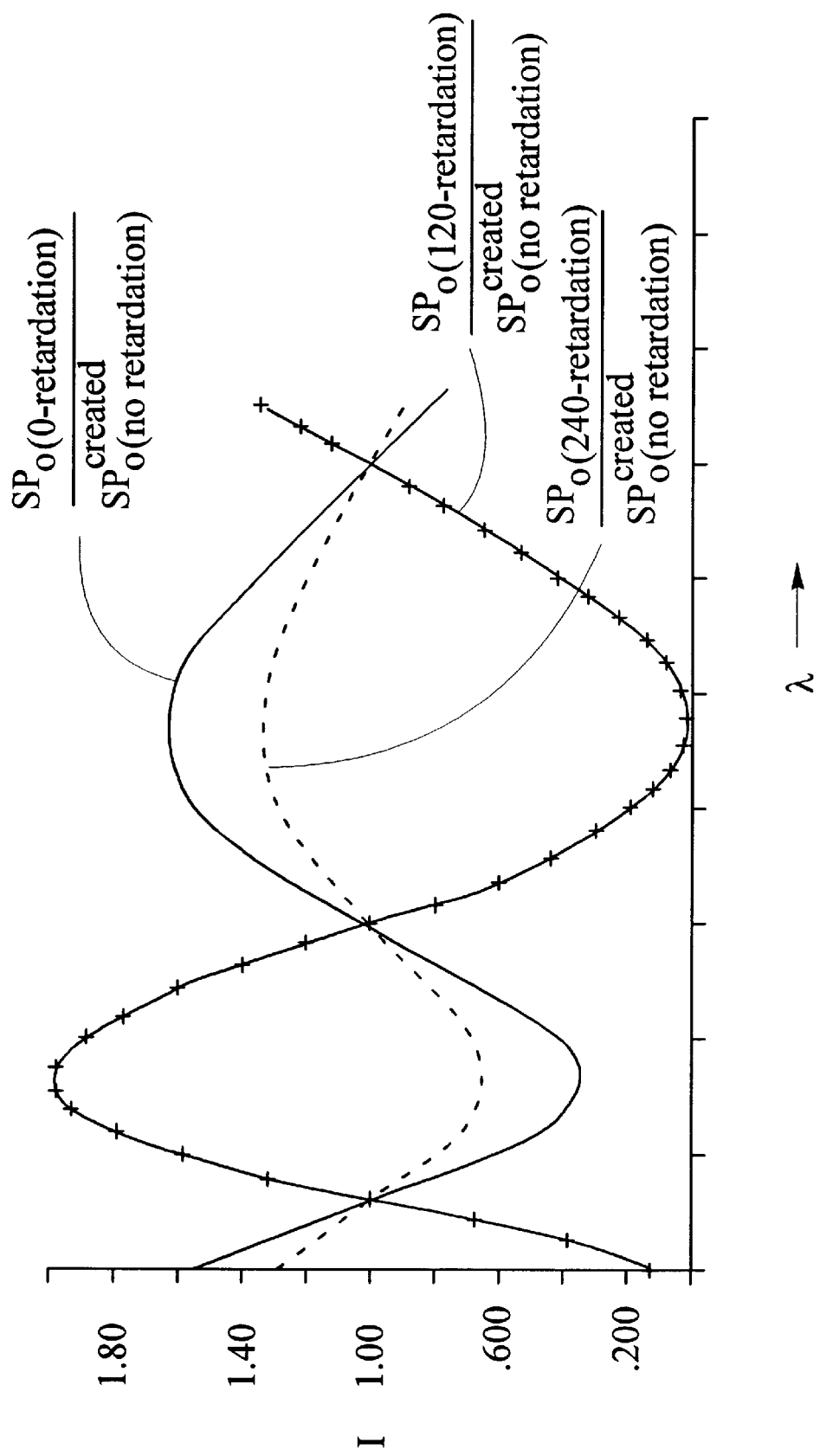

A typical set of these demodulated interference patterns is illustrated in FIG. 6e. This shows that in practice there is one combining device providing the largest amplitude of modulation and the other two being of lesser amplitude and π out of phase. If the three demodulated interference patterns are summed to negate the phase difference as $SP_{summed} = SP_{largest} - (SP_{medium} + SP_{smallest}) + 2$, the value of retardation R can be extracted from this summed demodulated interference pattern in a variety of ways including curve fitting using a fit function of the form $F(R) = 1 - S.A. \sin(2\pi R/\lambda_i)$, where S is a variable that may take the value of +1 or −1 to accommodate positive or negative values of α, A is a variable, in practice close to unity, and $\lambda_i$ is the midpoint wavelength for each array location. The birefringence value for the material can be calculated using this value R of retardation and previously measured path length for the light passing through the birefringent material. Typically this is the thickness of the material or twice the thickness when a reflector is used.

Figure 5A:
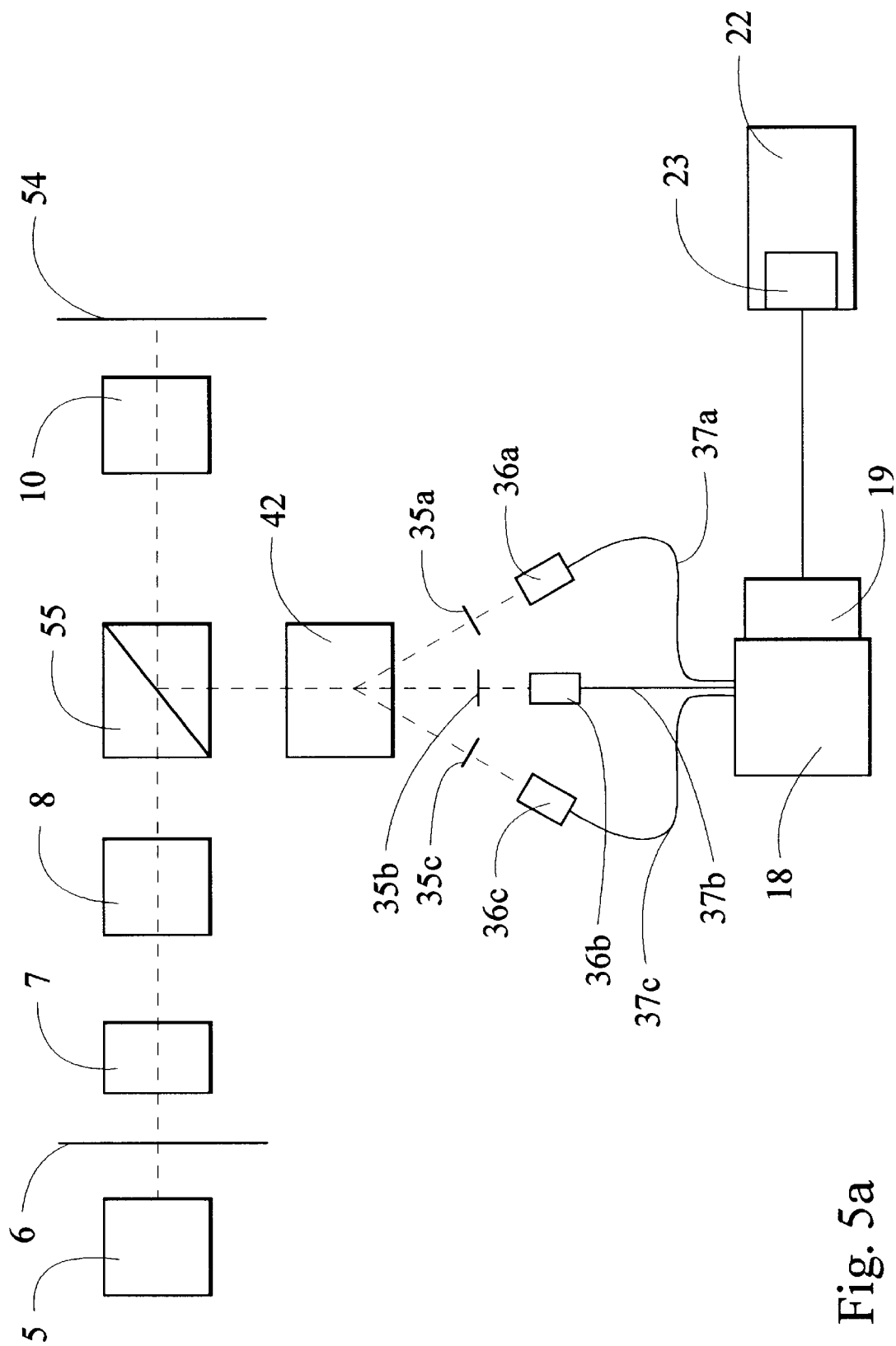
FIGS. 5a and 5b are block diagrams representations of this second preferred embodiment with reflection introduced into the light path.
Figure 5B:
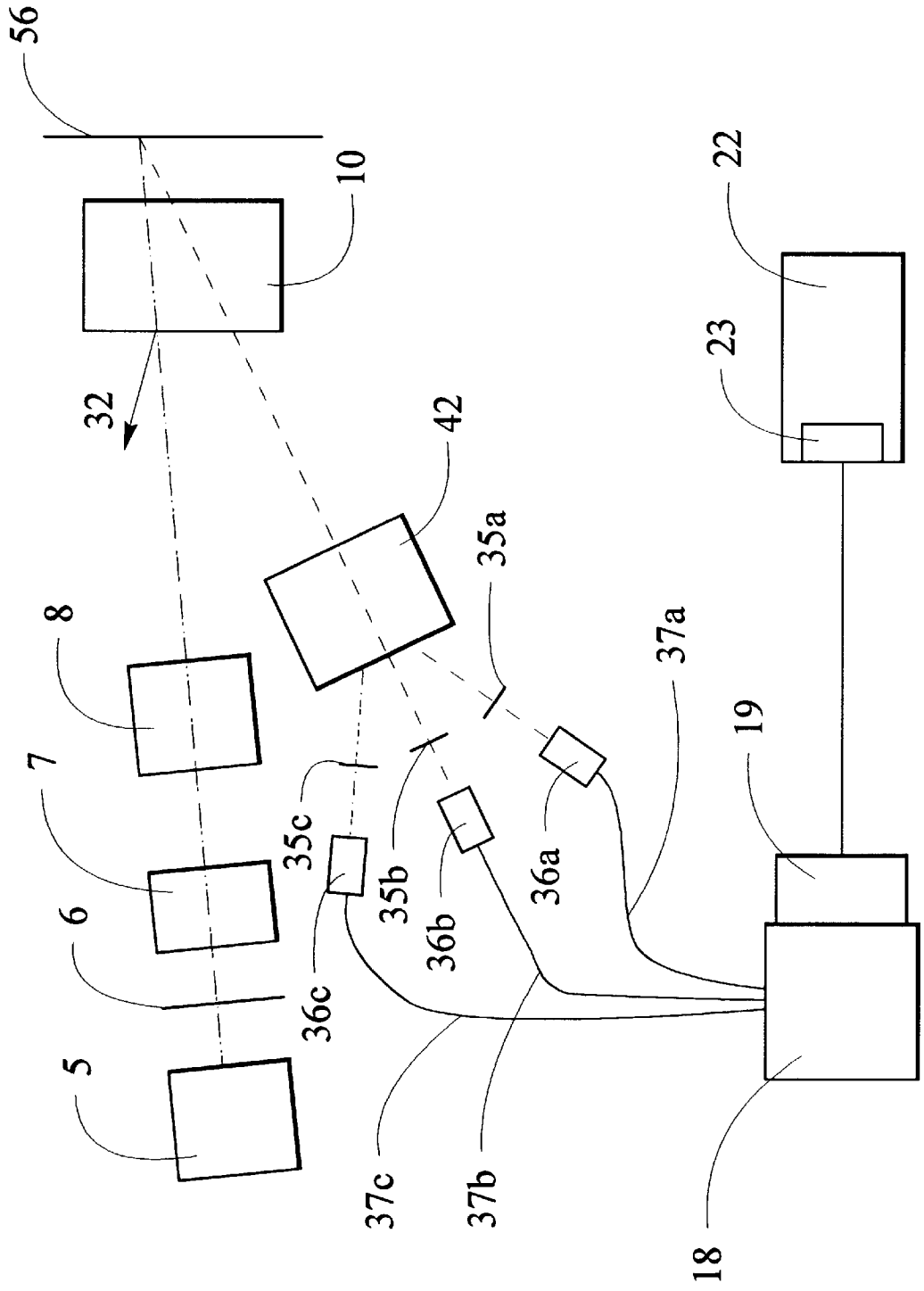

An alternative arrangement for the system described above and detailed in FIG. 4, introduces a reflector into the light path, either as a spectral reflector or full retroreflector 54 as shown in FIG. 5a wherein a beam separation 55 device is used to direct the reflected light to the combining linear polarizers; or using a partial retroreflector or a diffuse reflector 56 as shown in FIG. 5b where the path of the incident light and the light path from the birefringent material to the combining linear polarizers is established to avoid the spectral reflections 32 from the front surface of the birefringent material passing into the combining linear polarizers 35a, 35b, and 35c. For both forms of reflection as described above, the effect is to increase the path length of the light through the birefringent material thus increasing the retardation between the quadrature axes of the light.

The present invention is not limited to the embodiments that have been described above; rather, it is capable of variations and modifications such as use in a multiplexed manner where several inputs are analysed in parallel either by using multiple spectral separation inputs or by having multiple single or groups of inputs simultaneously applied to the spectral seperation device, and in other ways which will be evident to persons skilled in the art.

What I claim is:

1. In an optical system comprising a plurality of optical components including a light source, optical elements and a birefringent material capable of inducing retardation between quadrature components of light passing through the material, a method of determining the retardation caused by the birefringent material, comprising the steps of:

(a) providing input light, including multiple wavelengths of light, having a predetermined polarization state to the birefringent material;

(b) passing at least some of the light through a combining means for combining quadrature components of at least some of the light that has passed through at least some of the birefringent material to cause that light to interfere;

(c) detecting and recording information corresponding to intensity and wavelength of at least some of the light passed through the combining means to obtain a modulated spectral signature, wherein the spectral signature comprises differing amplitudes relating to at least a plurality of the multiple wavelengths of light;

(d) demodulating the spectral signature to remove spectral variations attributable to the light source and attenuations attributable to the other optical components in the light path, thus obtaining a spectral interference signature, this being the resultant modulation attributable to the effect of the birefringent material;

(e) using a suitably programmed computer in dependence upon the spectral interference signature to determine the retardation induced by the material.

2. The method as defined in claim 1, wherein the combining in step (b) includes the step of passing at least some of the light that has propagated through at least some of the birefringent material through a polarizing means to combine the quadrature components of the light and to allow these components to interfere.

3. The method as defined in claim 1, wherein the light in step (b), after having passed through at least some of the birefringent material, is reflected so as to repass through at least some of the birefringent material before at least some of the light passes to the combining means.

4. The method as defined in claim 1, wherein the demodulation of step (d) is effected by normalising the spectral signature by utilizing a spectral signature previously obtained and stored for the same optical system in the absence of the birefringent material.

5. The method as defined in claim 1, wherein the demodulation of step (d) is effected by normalizing the spectral signature by utilizing a spectral signature previously obtained and stored for the same optical system having the same or a similar birefringent material in place, that material causing no, or substantially no, retardation between quadrature components of light passing through it.

6. The method as defined in claim 1, wherein the light that is provided, passed through, combined and detected, is any portion or portions of the electromagnetic spectrum for which the birefringent material is not opaque and for which said can material exhibit retardation.

7. The method as defined in claim 1, wherein in addition to the retardation value determined in step (e) the variation in retardation as a function of wavelength is also determined.

8. The method as defined in claim 1, wherein the input light is linear polarized in any direction other than the directions of the optical axes of the birefringent material on the face where the light impinges, and wherein the combining in step (b) is performed by a linear polarizer, the axis of which is at any direction other than the directions of the optical axes of the birefringent material on the face from which the light emerges, and preferably where the polarization axes are at or near 45 degrees to the optical axes.

9. The method as defined in claim 1, wherein the input light is circular polarized, and wherein the combining in step (b) is performed by a linear polarizer the axis of which is at any direction other than the directions of the optical axes of the birefringent material on the face from which the light emerges, and preferably where the polarization axis is at or near 45 degrees to the optical axes.

10. The method as defined in claim 1, wherein the input light is circular polarized, and wherein the combining in step (b) is performed by a circular polarizer.

11. The method as defined in claim 1, wherein the input light is elliptically polarized and where the ellipticity may vary with wavelength, and wherein the combining in step (b) is performed by an elliptical polarizer for which the ellipticity may vary as a function of wavelength.

12. The method as defined in claim 1, wherein the input light is provided on a time discontinuous basis to the birefringent material such that light is predominantly supplied only during the time period that the detecting and recording occurs.

13. A method as defined in claim 1, wherein the step (e) of determining the retardation value comprises the determination of a value of retardation that theoretically creates and matches within predetermined limits the spectral interference signature obtained in step (d).

14. A method as defined in claim 1, wherein step (e) comprises the step of fitting the spectral interference signature to one of a plurality of theoretically generated curves relating to known values of retardation, using a best fit criteria.

15. A method as defined in claim 1, wherein the spectral interference signature is transformed into either a frequency or wave number form to which Fourier analysis is applied to determine a frequency component of the interference modulation from which the retardation value for the material is determined.

16. A method as defined in claim 1, wherein the combining of the quadrature components of the emerging light of step (b) is performed by passing at least some of the light in parallel through a plurality of linear polarizers, each polarizer with its axis of polarization set at different directions, and for each of which at least some of the light that has passed through the birefringent material passes.

17. A method as defined in claim 1, wherein in step (b) the combining of the quadrature components of the emerging light is performed by a plurality of linear polarizers, each with its axis of polarization oriented at known directions, for each of which at least some of the light that has passed through the birefringent material passes, these polarizers being configured so that the light passes through them in parallel and obtaining from each a modulated spectral signature, and wherein the demodulation of step (d) is effected by normalizing each of the spectral signatures obtained from the light emerging from each of the linear polarizers by using a reconstructed unmodulated spectral signature obtained by applying a summation process to the spectral signatures obtained from the plurality of linear polarizers, the summation process being dependent on the number of polarizers and the directions of their polarization axes, the retardation extraction process then being performed on either the dominant spectral interference signature, that being that signature from that linear polarizer that exhibits the greatest amplitude of modulation, or from several or all the signatures appropriately summed to allow for phase reversals, thereby improving the signal-to-noise ratio of the signature used in the retardation extraction process.

18. A method as defined in claim 1, wherein the predetermined state of polarization of the input light is circular, or is elliptically polarized and closely approaches circular polarization and wherein the step of combining of the quadrature components of the emerging light is performed by a plurality of linear polarizers, each with its axis of polarization oriented at known directions, for each of which at least some of the light that has passed through the birefringent material passes, these polarizers configured to perform in parallel and obtaining from each a modulated spectral signature, and wherein the demodulation of step (d) is effected by normalising each of the spectral signatures obtained from the light emerging from each of the linear polarizers by using a reconstructed unmodulated spectral signature obtained by applying a summation process to the spectral signatures obtained from the plurality of linear polarizers, the summation process being dependent on the number of polarizers and the directions of their polarization axes; the step of determining a retardation value being performed on either the dominant spectral interference signature, that being that signature from that linear polarizer that exhibits the greatest amplitude of modulation, or from several or all the signatures appropriately summed to allow for phase reversals, thereby improving the signal-to-noise ratio of the signature used in the retardation extraction process.

19. In an optical system comprising a plurality of optical components including a light source, optical elements and a birefringent material exhibiting birefringence, a method of determining the birefringence of the birefringent material, comprising the steps of:

(a) directing input light, including multiple wavelengths of light, having a predetermined polarization state to the birefringent material;

(b) combining quadrature components of at least some of the input light that has passed through at least some of the birefringent material to cause the light to interfere constructively and/or destructively depending upon the wavelength and magnitude of the retardation, to provide information corresponding to the spectral response of all the optical elements and detectors in the light path to the spectral energy input from the light source, including the effects of the interference;

(c) detecting and recording information corresponding to the intensity and wavelength of at least some of the light passing through a combining means to obtain a modulated spectral signature comprising differing amplitudes relating to at least a plurality of the multiple wavelengths of light;

(d) demodulating the modulated spectral signature to remove spectral variations attributable to the light source and attenuation attributable to the optical components, to obtain a spectral interference signature corresponding to the birefringent material;

(e) in dependence upon the spectral interference signature, using an appropriately programmed computer or other computational approach to extract the birefringence value of the birefringent material.

20. The method as defined in claim 19, wherein the combining step (b) includes the step of passing at least some of the light that has propagated through at least some of the birefringent material through a polarizing means to combine the quadrature components of the light and to allow these components to interfere.

21. The method as defined in claim 19, wherein the light in step (b), after having passed through at least some of the birefringent material, is reflected so as to repass through at least some of the birefringent material before at least some of the light passes to the combining means.

22. The method as defined in claim 19, wherein the demodulation of step (d) is effected by normalising the spectral signature by a spectral signature previously obtained and stored for the same optical system in the absence of the birefringent material.

23. The method as defined in claim 19, wherein the demodulation of step (d) is effected by normalising the spectral signature with a spectral signature previously obtained and stored for the same optical system having the same or similar birefringent material in place but that material having no, or substantially no, birefringence.

24. The method as defined in claim 19, wherein the light that is provided, passed though, combined and detected, is any portion or portions of the electro-magnetic spectrum for which the birefringent material is not opaque and for which can exhibit birefringence.

25. The method as defined in claim 19, wherein in addition to the birefringence determined in step (e), the variation in birefringence as a function of wavelength is also determined.

26. The method as defined in claim 19, wherein the input light is linear polarized in any direction other than the directions of optical axes of the birefringent material on the face where the components of the emerging light impinges, and where the combining step (b) is performed by a linear polarizer the axis of which is at any direction other than the directions of the optical axes of the birefringent material on the face from which the light emerges, and preferably where the polarization axes are at or near 45 degrees to the optical axes.

27. The method as defined in claim 19, wherein the input light is circular polarized, and where the combining step (b) is performed by a linear polarizer the axis of which is at any direction other than the directions of optical axes of the birefringent material on the face from which the light emerges, and preferably where the polarization axis is at or near 45 degrees to the optical axes.

28. The method as defined in claim 19, wherein the input light is circular polarized, and where the combining step (b) is performed by a circular polarizer.

29. The method as defined in claim 19, wherein the input light is elliptically polarized and where the ellipticity may vary with wavelength, and where the combining step (b) is performed by an elliptical polarizer for which the ellipticity may vary as a function of wavelength.

30. The method as defined in claim 19, wherein the input light is provided on a time discontinuous basis to the birefringent material such that light is predominantly supplied only during the time period that the detecting and recording occurs.

31. A method as defined in claim 19, wherein the extraction of the birefringence value of step (e) comprises the determination of that value of birefringence that would theoretically create and therefore match the spectral interference signature obtained in step (d) for a light path length the same as the light path through the birefringent material.

32. A method as defined in claim 19, wherein step (e) comprises the step of fitting the data to one of a plurality of theoretically generated curves relating to known values of birefringence and light path length, using a best fit criteria.

33. A method as defined in claim 19, wherein the spectral interference signature is transformed into either a frequency or wave number form and to which Fourier analysis is applied to determine a frequency component of the interference modulation from which the birefringence value for the material is determined.

34. A method as defined in claim 19, wherein in step (b) the combining of the quadrature components of the emerging light is performed by a plurality of linear polarizers arranged in parallel, each with its axis of polarization set at different directions, and for each of which at least some of the light that has passed through the birefringent material passes.

35. A method as defined in claim 19, wherein step (b) the combining of the quadrature components of the emerging light is performed by a plurality of linear polarizers, each with its axis of polarization oriented at known directions, for each of which at least some of the light that has passed through the birefringent material passes, these polarizers acting in parallel and obtaining from each a modulated spectral signature, and wherein the demodulation of step d) is effected by normalising each of the spectral signatures obtained from the light emerging from each of the linear polarizers by using a reconstructed unmodulated spectral signature obtained by applying a summation process to the spectral signatures obtained from the plurality of linear polarizers, the summation process being dependent on the number of polarizers and the directions of their polarization axes, the birefringence extraction process being performed on either a dominant spectral interference signature, that being that signature from a linear polarizer that exhibits the greatest amplitude of modulation, or from several or all the signatures appropriately summed to allow for phase reversals, thereby improving the signal-to-noise ratio of the signature used in the birefringence extraction process.

36. A method as defined in claim 19, wherein the predetermined state of polarization of the input light is circular or elliptical and closely approaches circular polarization and where in step (b) the combining of the quadrature components of the emerging light is performed by a plurality of linear polarizers, each with its axis of polarization oriented at known directions, for each of which at least some of the light that has passed through the birefringent material passes, these polarizers configured to perform in parallel and obtaining from each a modulated spectral signature, and wherein the demodulation of step (d) is effected by normalising each of the spectral signatures obtained from the light emerging from each of the linear polarizers by using a reconstructed unmodulated spectral signature obtained by applying a summation process to the spectral signatures obtained from the plurality of linear polarizers, the summation process being dependent on the number of polarizers and the directions of their polarization axes, the birefringence extraction process being performed on either a dominant spectral interference signature, that being that signature from that linear polarizer that exhibits the greatest amplitude of modulation, or from several or all the signatures appropriately summed to allow for phase reversals, thereby improving the signal-to-noise ratio of the signature used in the birefringence extraction process.

37. An apparatus for use in determining birefringence in a birefringent material, or retardation between quadrature components of light passing along a path through the birefringent material, comprising:

means including a light source for providing polarized light containing a plurality of wavelengths to the birefringent material, means for combining quadrature components of this light that has passed through the birefringent material to induce spectral interference, spectral separation means for receiving the light from the combining means and spatially or angularly separating the light on the basis of wavelength, means for measuring intensity of received separated light and for measuring intensity at a plurality of wavelengths, means for storing intensity measurements, computation means programmed to provide spectral arrays from information relating to the stored intensity measurements, and demodulate these spectral arrays using previously stored spectral arrays to form a waveform which varies in amplitude for different values of wavelength as a function of the retardation or birefringence in the material, and, calculate a value of retardation or birefringence which gives rise to the amplitude variations in the demodulated array.

38. An apparatus as defined in claim 37, wherein one or several optical fibres are provided defining one or more light paths between at least two optical elements.

39. An apparatus as defined in claim 37, including a reflector disposed in the light path to cause light that has passed through the birefringent material to repass back through the material and thence to the combining means.

40. An apparatus for use in determining birefringence in a birefringent material, or retardation between quadrature components of light passing along a path through the birefringent material, comprising:

means including a light source for providing polarized light containing a plurality of wavelengths to the birefringent material, plural means for combining quadrature components of this light that has passed through the birefringent material to induce spectral interference, spectral separation means for receiving the light from the plurality of combining means and spatially or angularly separating the light on the basis of wavelength, means for measuring intensity of received separated light and for measuring intensity at a plurality of wavelengths, means for storing intensity measurements, computation means programmed to provide spectral arrays from information relating to the stored intensity measurements, and, calculate a value of retardation or birefringence which gives rise to the amplitude variations in the spectral arrays.

41. An apparatus as defined in claim 40, wherein the polarization of the light is performed by a means for linearly polarizing light, the axis of which is at any orientation to the optical axes of the birefringent material other than in alignment to these axes and is preferably at 45 degrees to these axes, and wherein the plural means for combining the quadrature components of the light are linear polarizers.

42. An apparatus as defined in claim 40, wherein the polarization of the light is performed by a means for linearly polarizing light, the axis of which is at any orientation to the optical axes of the birefringent material other than in alignment to these axes and is preferably at 45 degrees to these axes, and wherein the plural means for combining the quadrature components of the light are linear polarizers, for which the directions of the axes are different and such that for at least one, the axis is at an orientation to the optical axes of the birefringent material other than in alignment to these axes.

43. An apparatus as defined in claim 40, wherein the polarization of the light is performed by a circular polarizer means, and wherein the plural means for combining the quadrature components of the light are linear polarizers, for which the directions of the axes are different and such that for at least one, the axis is at an orientation to the optical axes of the birefringent material other than in alignment to these axes.

44. An apparatus as defined in claim 40, wherein the means including the light source for providing polarized light includes means for elliptically polarizing the light, and wherein the plural means for combining the quadrature components of the light are elliptical polarizers, and where the ellipticity of each of the polarizers may vary with wavelength.

45. An apparatus as defined in claim 40, wherein the spectral separation means is comprised of separate separation means associated with each of the plural means for combining.

46. An apparatus as defined in claim 40, wherein the spectral separation means is comprised of a single separation means through which the light associated with each of the plural combining means passes with spatial separation between each light path.

47. An apparatus as defined in claim 40, wherein the spectral separation means comprises a prism.

48. An apparatus as defined in claim 40, wherein the spectral separation means comprises a ruled or holographic grating.

49. An apparatus as defined in claim 47, wherein the prism for providing spectral separation is rotatable for changing its orientation in the light path to cause the wavelength of the light received by the intensity measurement means to change for each successive orientation.

50. An apparatus as defined in claim 48, wherein the grating for providing spectral separation is rotatable for changing its orientation in the light path to cause the wavelength of the light received by the intensity measurement means to change for each successive orientation.

51. An apparatus as defined in claim 40, wherein the intensity measurement means comprises an array of detectors.

52. An apparatus as defined in claim 40, wherein the intensity measurement means comprises a two dimensional array of detectors.

53. An apparatus as defined in claim 40, wherein one or several optical fibres are provided defining one or more light paths between at least two optical elements.

54. An apparatus as defined in claim 40, including a reflector disposed in the light path to cause light that has passed through the birefringent material to repass back through the material and thence to the combining means.

55. An apparatus as defined in claim 54, wherein the reflector is a specular reflector.

56. An apparatus as defined in claim 54, wherein the reflector is a partial or full retroreflector.

57. An apparatus as defined in claim 54, wherein the reflector is a substantially diffuse reflector.

58. An apparatus as defined in claim 54, wherein the reflector is adjacent to, and may form part of, the face of the birefringent material from which, if the reflector was not present, the light would have emerged.

59. An apparatus as defined in claim 54, wherein a means for beam separation is included for directing at least some of the reflected light out of the path of the provided polarized light, thereby directing it to the combining means.

60. A method as defined in claim 3, wherein an angular relationship is established between the direction of the light provided by the light source and the direction of the light received by the combining means, by locating the means for providing polarized light and the means for combining the quadrature components of the light such that the combining means does not receive light from the light source that is reflected from a surface of the birefringent material without that light having first passed through at least some of the material.

61. An apparatus as defined in claim 40, wherein the computation means is programmed to create spectral arrays from the stored intensity measurements, and demodulate these using spectral arrays formulated by a summation process applied to the stored intensity measurements, and calculate the value of retardation or birefringence which gives rise to the demodulated arrays.

62. An apparatus as defined in claim 37, wherein the light is provided on a time discontinuous basis, the time at which it is provided is synchronized to when the measuring of the intensity of the received separated light occurs.

63. An apparatus as defined in claim 40, wherein the light is provided on a time discontinuous basis, the time at which it is provided is synchronized to when the measuring of the intensity of the received separated light occurs.

64. A method as defined in claim 21, wherein an angular relationship is established between the direction of the light provided by the light source and the direction of the light received by the combining means, by locating the means for providing polarized light and the means for combining the quadrature components of the light such that the combining means does not receive light from the light source that is reflected from a surface of the birefringent material without that light having first passed through at least some of the material.

* * * * *